United States Patent [19]

Zuckerman

[11] Patent Number: 5,069,000

[45] Date of Patent: Dec. 3, 1991

[54] REVERSING APPARATUS FOR POWERED VEHICLE DOOR SYSTEMS

[75] Inventor: Lawrence H. Zuckerman, Easton, Pa.

[73] Assignee: Masco Industries, Inc., Taylor, Mich.

[21] Appl. No.: 497,546

[22] Filed: Mar. 22, 1990

[51] Int. Cl.[5] ............................................. E05F 15/02
[52] U.S. Cl. ........................................ 49/28; 49/214; 49/360
[58] Field of Search ................. 49/214, 213, 362, 360, 49/28, 29, 30

[56] References Cited

U.S. PATENT DOCUMENTS

| | | |
|---|---|---|
| 2,628,091 | 2/1953 | Rappl . |
| 3,069,151 | 12/1962 | Cook et al. . |
| 3,124,344 | 3/1964 | Mano . |
| 3,141,662 | 7/1964 | Wise . |
| 3,202,414 | 8/1965 | Simmons et al. . |
| 3,344,554 | 10/1967 | Misaka et al. . |
| 3,398,484 | 8/1968 | Katsumura et al. . |
| 3,479,767 | 11/1969 | Gardner et al. . |
| 3,653,154 | 4/1972 | Hayday . |
| 3,844,062 | 10/1974 | Daugirdal ..................... 49/214 X |
| 3,893,260 | 7/1975 | Cadiou . |
| 4,121,382 | 10/1978 | Dietrich et al. . |
| 4,183,177 | 1/1980 | Kurdziel . |
| 4,314,692 | 2/1982 | Brauer et al. . |
| 4,422,521 | 12/1983 | Mochida . |
| 4,462,185 | 7/1984 | Shibuki et al. . |
| 4,489,640 | 12/1984 | Olson . |
| 4,530,185 | 7/1985 | Moriya et al. . |
| 4,546,845 | 10/1985 | Meyer et al. . |
| 4,549,369 | 10/1985 | Foley, Jr. . |
| 4,612,729 | 9/1986 | Sato . |
| 4,617,757 | 10/1986 | Kagiyama et al. . |
| 4,621,223 | 11/1986 | Murakami et al. ............... 49/28 X |
| 4,640,050 | 2/1987 | Yamagishi et al. . |
| 4,644,692 | 2/1987 | Schindehutte . |
| 4,644,693 | 2/1987 | Wang . |
| 4,686,598 | 8/1987 | Herr ................................. 49/28 X |
| 4,775,178 | 10/1988 | Boyko . |
| 4,831,509 | 5/1989 | Jones et al. ..................... 49/28 X |
| 4,842,313 | 6/1989 | Boyko et al. . |
| 4,862,640 | 9/1989 | Boyko et al. . |
| 4,887,390 | 12/1989 | Boyko et al. . |

FOREIGN PATENT DOCUMENTS

| | | |
|---|---|---|
| 0017515 | 10/1980 | European Pat. Off. . |
| 3523261 | 1/1986 | Fed. Rep. of Germany . |
| 2578078 | 8/1986 | France . |
| 620336 | 3/1949 | United Kingdom . |

Primary Examiner—Philip C. Kannan
Attorney, Agent, or Firm—Harness, Dickey & Pierce

[57] ABSTRACT

An obstruction detecting reversing apparatus is disclosed for a motor driven device, such as a powered vehicle door or window system, wherein the device undergoes varying loads, and consequently varying current draws, during normal operation. In order to accurately detect the presence of an obstruction, in light of such normally varying currents, the apparatus circuit logic monitors instantaneous motor current and compares it with the time average of motor current over a very short preceding time interval, which "tracks" normal current draw in order to sense an obstruction-caused rise in motor current at virtually any stage of the door closing operation, and thus also accommodates normal changes in current draw caused by different gravity effects when the device is oriented in different grade-caused orientations.

18 Claims, 16 Drawing Sheets

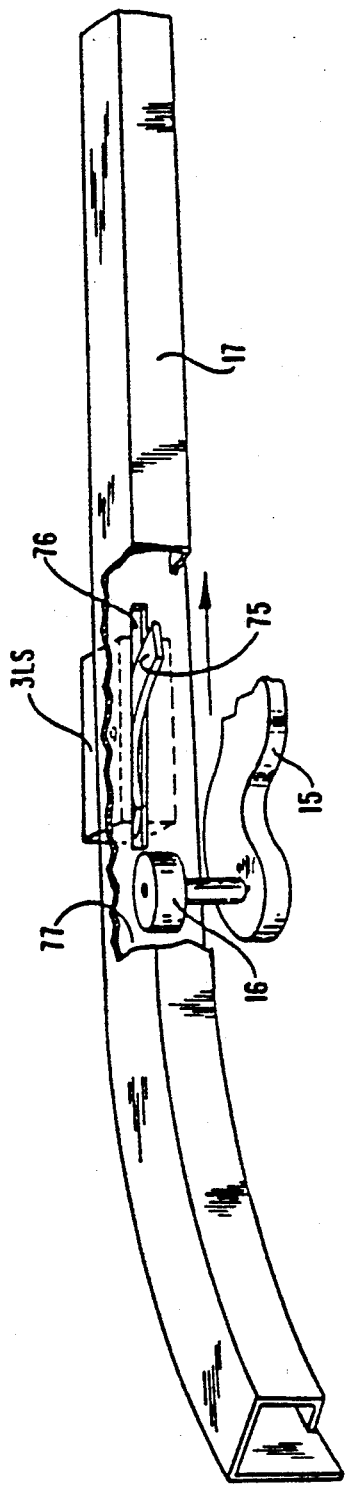
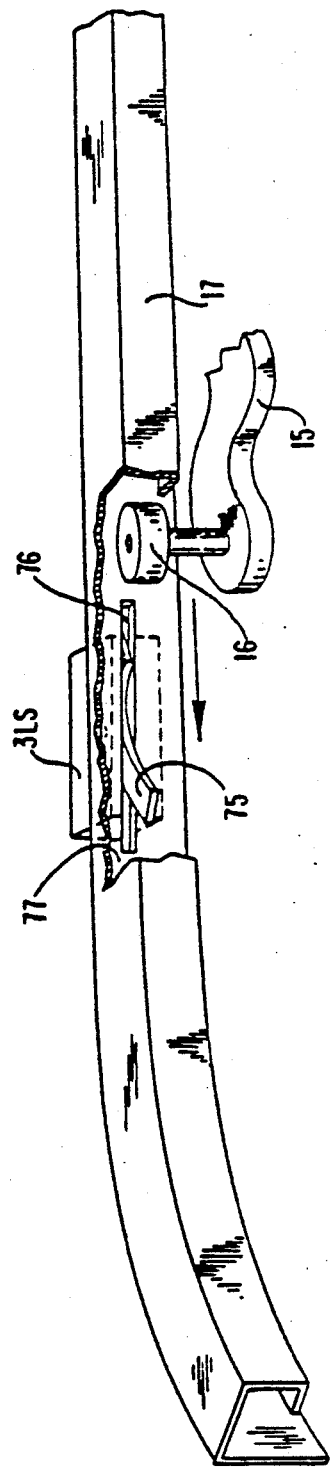
FIG. 15A
FIG. 15B

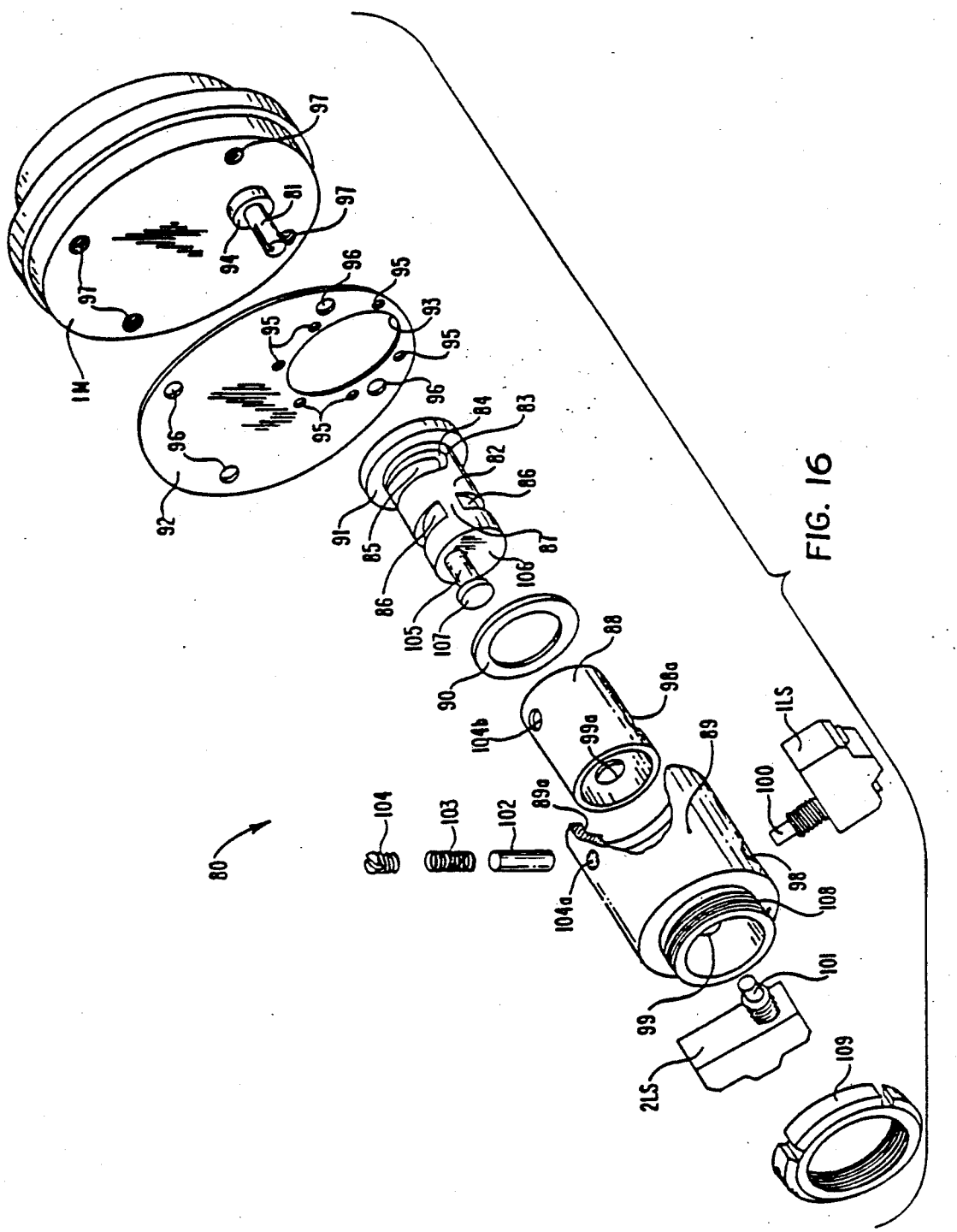

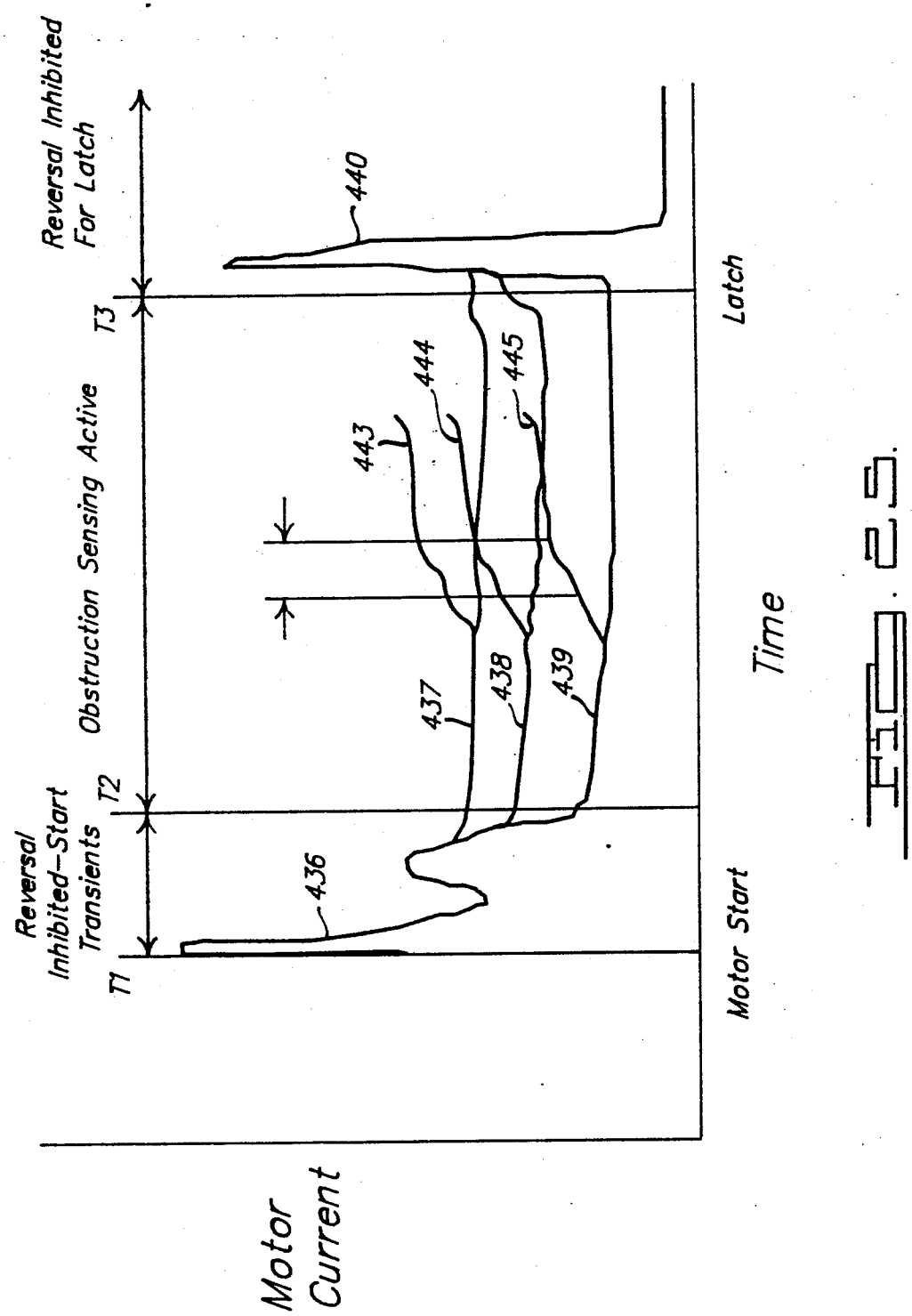

REVERSING APPARATUS FOR POWERED VEHICLE DOOR SYSTEMS

CROSS REFERENCE TO RELATED PATENTS AND APPLICATIONS

This invention is related to the inventions disclosed and claimed in U.S. Pat. Nos. 4,887,390; 4,862,640; 4,842,313; and 4,775,178, all of which are assigned to the same assignee as the present invention, and the disclosures which are hereby incorporated by reference herein. This invention is also related to the inventions disclosed and described in related copending applications for U.S. Patents, entitled "VARYING RADIUS HELICAL CABLE SPOOL FOR POWERED VEHICLE DOOR SYSTEMS", "CONTROL APPARATUS FOR POWERED VEHICLE DOOR SYSTEMS", and "POWERED CLOSING ASSIST MECHANISM FOR VEHICLE DOORS OR LID MEMBERS", all of which are filed on the same date as this application and are assigned to the same assignee as the present invention, and the disclosures of which are hereby incorporated by reference herein.

BACKGROUND AND SUMMARY OF THE INVENTION

This invention relates to a reversing apparatus for motor-actuated devices for detecting a predetermined abnormal load on such devices and for stopping and reversing the drive motor in response to the presence of such abnormal load, such as the presence of an obstruction. The reversing apparatus is especially applicable to powered sliding door operating systems for vehicles and, more particularly, to such powered sliding door operating systems for van type vehicles having a door opening in a side wall of the van. In such applications of the invention, the sliding door is moved generally parallel to the van side wall during its initial closing movement and for a major portion of its full closing movement as well as during a major portion of its full opening movement, including its final opening movement. Typically, the sliding door moves generally toward and generally away from the plane of the door opening during a portion of its respective final closing and initial opening movements, so as to be flush with the side wall when fully closed, and so as to be alongside of, and parallel to, the side wall, generally rear of the door opening, when fully opened.

In sliding door systems of the type mentioned above, upper and lower forward guide rails are attached to the top and bottom portions, respectively, of the door opening, and a rear guide rail is attached to the exterior of the side wall, at an elevation approximately midway between the elevation of the upper and lower forward guide rails. The respective forward end portions of the various guide rails are curved inwardly of the body of the van, and bracket and roller assemblies are fastened to the respective upper and lower forward ends of the sliding door, as well as to an intermediate position at the rear end of the sliding door. Such bracket and roller assemblies are slidingly supported in the guide rails to guide the door through its opening and closing movements.

Various portions of the opening and closing movements of van sliding doors have different power requirements. Thus, the initial door closing movement and a major portion of the subsequent door closing movement are high displacement/low force translational movements, during which little force is required to achieve large door movements since only frictional resistance and grade-caused gravity resistances must be overcome. Similarly, the final opening movement and a major portion of the preceding opening movement are also high displacement/low force translational movements for the same reasons. In contrast however, a portion of the final closing movement of the door is a low displacement/high force movement. This is because during final closing, an elastomeric weather seal surrounding the door opening must be compressed, and an unlatched latch bolt on the door must engage and be rotated to a latched position by a striker pin at the rear of the van body door opening. During manual operation, sliding van doors are typically moved with great momentum through their entire closing movements in order to assure full weather strip compression and latch bolt operation at the end of such movement.

Various powered van door systems have been developed in the past, including those described in the above-mentioned related U.S. patents. Another such system is illustrated in U.S. Pat. No. 4,612,729, issued to Sato. In the Sato patent, a motor driven pinion carried by the lower front bracket and roller assembly of the door cooperates with a rack gear carried by the lower front guide rail in the door opening to move the door between its fully open and fully closed positions. In this arrangement, as in the case of the manual door operation discussed above, a high momentum is still required during the entire closing movement.

Similarly, U.S. Pat. No. 4,617,757, issued to Kagiyama et al, and U.S. Pat. No 4,640,050, issued to Yamagishi et al also represents additional examples of powered van door systems. The systems employ cable drives coupled to the lower front bracket and roller assemblies of the doors for opening and closing movements However, these systems also rely on high momentum during the entire closing movement.

U.S. Pat. No. 4,462,185 issued to Shibuki et al describes still another powered van door system. In this system, a friction wheel engages the bottom portion of the door and drives the door through the major portions of its opening and closing movements parallel to the side wall of the van. Turntable arms are pivotably connected end-to-end between the friction wheel and the floor of the door opening and draws the rear of the door inwardly to compress the weather strip, While this prior art design appears to operate with lower momentum forces during closing movement than those discussed above, it requires a complicated, costly mechanism that is difficult to install and difficult to repair in the event of a breakdown. Moreover, retrofiting this mechanism to a vehicle not originally equipped with a powered door system would be inordinately difficult.

In addition to the foregoing prior art systems, final closing devices or clamping mechanisms for powering the final, low-displacement/high-force movement of sliding van doors have been developed by the assignee of the present invention and are described in the above-mentioned U.S. Pat. Nos. 4,775,178 and 4,842,313, the disclosures of which are incorporated by reference herein. In each of these systems, the door includes a latch bolt member moveable between latched and unlatched positions, as well as a handle or a lock member movable between open and closed positions. The final closing device or clamping mechanisms each includes a striker support plate mounted on the vehicle body at the rear of the door opening for rotational movement about a perpendicular axis, a striker pin projecting from the striker support plate at a position offset from the axis, and means carried by the vehicle body for rotating the striker support plate. The striker pin is movable between extended and retracted positions so that when the striker pin is engaged by the latch member bolt the striker support plate is rotated, and the sliding door is moved between a partially open position away from the door opening and a fully closed position. In addition to disclosing the foregoing structure, U.S. Pat. No 4,842,313 also discloses a crashworthiness feature that adds a pawl and ratchet mechanism to prevent the striker support plate from being reversely rotated in response to high door opening forces from the inside of the vehicle.

Although U.S. Pat. Nos. 4,775,178 and 4,842,313 illustrate excellent final closing systems for sliding van doors, they do not include provisions for powering van doors through the major portions of opening and closing movements, nor do they include provisions for powering van doors during late closing movements to the point where the latch bolt mechanisms engage with, and close about, the striker pins of the clamping mechanisms.

Improved powered sliding door operator systems for van type vehicles are disclosed in the above-mentioned U.S. Pat. No. 4,862,640, with the disclosed systems having provisions (i) for powering sliding van doors through the major portions of opening and closing movements, (ii) for powering sliding van doors during late closing movements to engage the latch bolt mechanisms with the striker pins, and (iii) for finally clamping sliding van doors to a fully closed position. In such patent the disclosure of which is hereby incorporated by reference, the door is supported adjacent its forward end by forward brackets slidable in upper and lower forward guide members carried by the vehicle body, and is supported adjacent its rear end by a rear bracket slidable in a mid-level rear guide member carried on the outside of the vehicle side panel. Motor driven cable members are attached to the rear bracket and supported adjacent opposite ends of the rear guide member and are employed to move the door through its opening movement through its initial closing movement, and through an initial portion of its final closing movement. The final portion of its closing movement is accomplished using a final clamping mechanism of the type disclosed in the above-mentioned U.S. Pat. No. 4,842,313.

It is therefore, a primary object of the present invention to provide an improved powered sliding door operator system for van type vehicles in which the sliding door is moved with low momentum between its fully open position and its nearly closed position, and which completely closes the sliding door in a slow controlled manner.

Another object of this invention is to provide an improved powered sliding door operator system in which the manual effort required to open and close the sliding door is substantially reduced, in which near-normal manual operation of the sliding door is preserved in the event of a failure of the powered system, and in which the powered system can be actuated from either the vehicle driver's seat or the door itself.

A primary object of the present invention is to provide a mechanism or system capable of detecting an obstruction encountered by a moving door, or other moving member in other powered actuating devices, such as powered vehicle windows, for example, and then stopping and/or reversing such motion in order to prevent damage to the obstruction, to the moving door or other member, or to the powered actuating equipment.

Still another related object of the invention is to accomplish the above-mentioned obstruction detection and motion reversing within a predetermined, acceptable time, within a predetermined obstruction resistance force when the moving door or member is disposed within a predetermined range of angular positions (such as those resulting from a vehicle situated on an upwardly or downwardly inclined grade), and within a predetermined temperature range likely to be encountered by the powered vehicle door system or other powered actuating system.

In accordance with one exemplary embodiment or application of the invention, a powered door operator system is provided for a door slidingly supported relative to a door opening in a side panel of a vehicle body. The door is supported adjacent its forward end by at least one forward bracket that is slidable in a forward guide member and adjacent its rear end by a rear bracket that is slidable in a rear guide member. The guide members guide the door (i) through an initial closing movement generally parallel to the side panel (ii) through a final opening movement generally parallel to the side panel, (iii) through at least a portion of its final closing movement generally toward the plane of the door opening, and (iv) through at least a portion of its initial opening movement generally away from the plane of the door opening. The door operator system includes cable members coupled to the forward and rear ends of the door for driving the door along the guide members to thereby move the door through its initial and final opening and closing movements, substantially without the need for cable spool assembly tensioning mechanisms.

An improved cable spool arrangement is provided in such exemplary application of the invention for a cable-actuated device, such as for a powered van door system, for example, having a drive mechanism for selectively rotating the cable spool about an axis in either direction and one or more cables each having one end interconnected with a movable member, such as a sliding door. The cable spool includes a cable attachment arrangement for securing the opposite end or ends of the cable or cables to the cable spool. A groove, slot, or other open channel-like opening is formed along a generally helical path on a circumferential portion of the cable spool. The groove is adapted for windingly receiving or taking up at least one of the cables therein as the cable spool is rotated in one direction, and for unwindingly releasing or paying out at least one of the cables therefrom as the cable spool is rotated in the opposite direction. The helical configuration of the cable spool groove eliminates the undesirable constantly changing effective spool radius that results from cable wrap-up or stacking on cable spools having one or more circular or non-helical grooves. Thus, the cable take-up and pay-out rates relative to cable spool rotation, can be more closely defined and controlled.

In addition, in the preferred cable spool in such exemplary application, the radial depth (and thus the wrap-up and pay-out radius) of the helical groove varies along at least a portion of the helical path in order to cause at least one of the cables to be wound onto, and paid out from, the varying-depth portion of the helical groove at a correspondingly varying rate with respect to cable spool rotation. This effect can be used to cause movement of at least a portion of the sliding door, or other such movable member, at a correspondingly varying rate with respect to cable spool rotation. If desired in a given application, the cable spool can have a generally constant radial depth of the helical groove along second portion of the helical path in order to cause at least one of the cables to be wound onto, and paid out from, the constant-depth portion of the helical groove at a generally constant rate with respect to cable spool rotation. This effect can be used to cause movement of at least a portion of the sliding door or other movable member, at a generally constant rate with respect to cable spool rotation.

In accordance with the present invention, a reversing apparatus is provided for detecting the presence of an obstruction encountered by the movable door, or other movable member such as a power window, for example, and causing a stoppage and/or reversal of its motion in order to substantially prevent damage to the obstruction, the door or other movable member, or the powered actuating system. The reversal apparatus uses changes in drive motor currents during door actuation that indicate the presence of an obstruction by comparing the instantaneous motor current with a reference current that is averaged over a predetermined short time interval. This feature makes the reversing apparatus independent of the normally varying drive motor current, with such normal variance resulting from the changes in the types of door closing movements described above. Thus, the reversing apparatus properly senses or detects the presence of an obstruction even for van-type sliding doors or other movable powered-actuated members, that undergo varying or complex movements, or changing relationships between travel speed and force at various stages of their operation, and that draw different amounts of drive motor current when disposed in different angular, or grade-caused, orientations.

Additional objects, advantages, and features of the present invention will become apparent from the following description and appended claims, taken in conjunction with the accompanying drawings.

BRIEF DESCRIPTION OF THE DRAWINGS

FIGS. 15A and 15B are fragmentary perspective views of a limit switch arrangement in the upper forward guide of the sliding door, which is actuated and deactuated when the door reaches a predetermined intermediate point during its movement between its fully opened and closed positions.

FIG. 16 is an exploded perspective view of one form of a final closure or clamping mechanism employed to move the nearly closed sliding door to its fully closed position.

FIG. 25 is a typical plot of drive motor current versus time during a door closing operation.

DETAILED DESCRIPTION OF THE PREFERRED EMBODIMENTS

Figure 1:
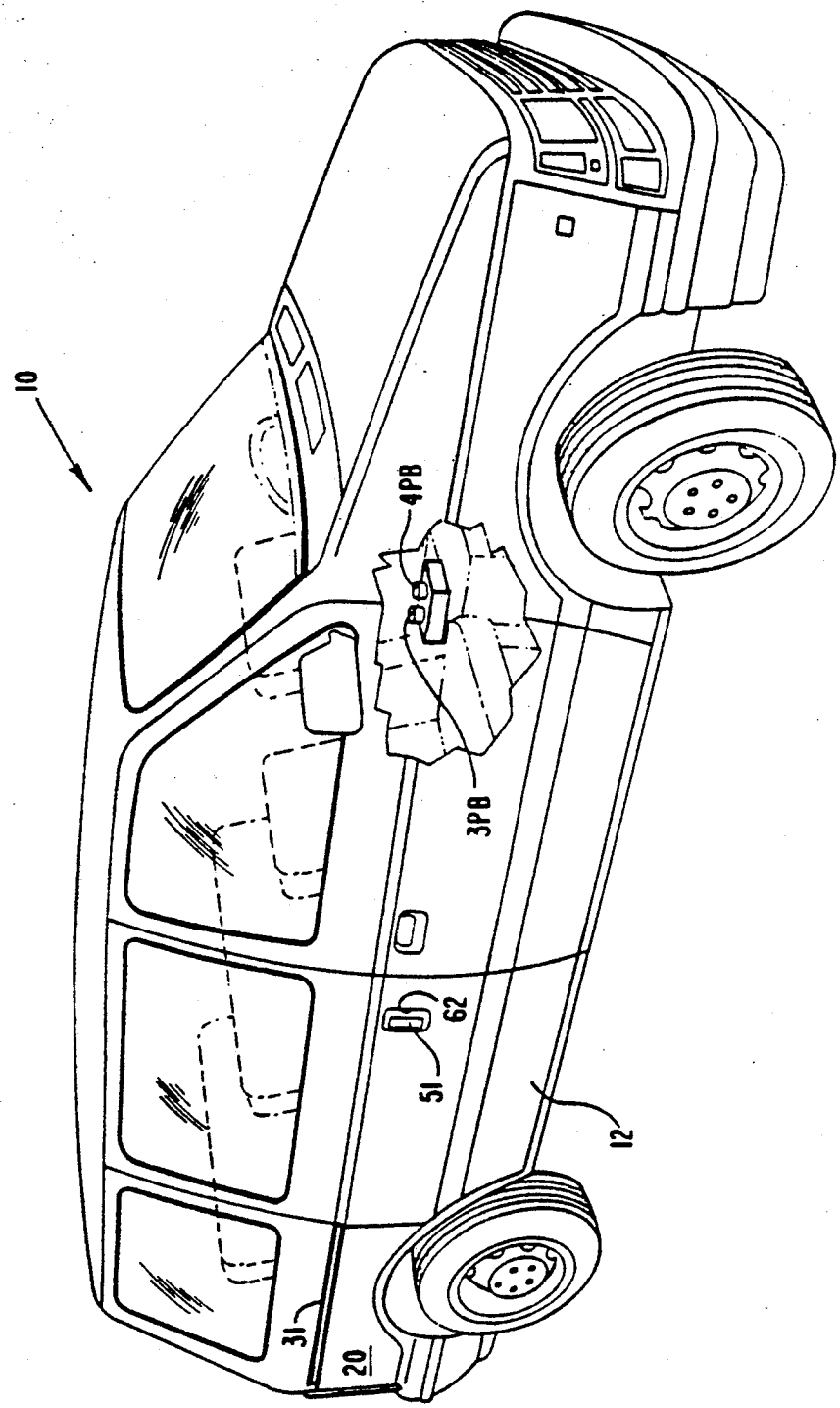
FIG. 1 is a perspective view, with parts broken away for clarity, of a van-type vehicle having a powered sliding door operating system in accordance with the present invention.

FIGS. 1 through 25 show one preferred embodiment of the present invention, as applied to a powered door operating system for a vehicle sliding door, for purposes of illustration only. One skilled in the art will readily recognize from the following discussion that the principles of the present invention are equally applicable to powered door operating systems for applications other than the vehicular application illustrated in the drawings, as well as to non-door or non-vehicular cable-actuated devices having one or more actuating cables.

In FIGS. 1 through 8, a van type of vehicle 10 is illustrated, and a powered door operator and door operating system according to the invention is used to open and close a sliding door 12. The sliding door 12 is supported on the body of the van 10 at three points. The first point of support includes a forward upper bracket and roller assembly shown generally at reference numeral 14 (FIGS. 2 and 8), which in turn includes an arm 15 one end of which is fastened to the upper forward end of door 12, and the other end of which carries one or more rollers 16 on its upper surface. A number of rollers 16 engage and ride in a curved upper forward guide rail or guide member 17 is fixedly carried on the lower surface of a vehicle body member 18, which surrounds a door opening 19 formed in a side wall 20 of the van 10.

The second point of attachment comprises a forward lower bracket and roller assembly, shown generally at reference numeral 21, which includes an arm 22 having one end fixedly attached to the lower forward end of the door 12 and one or more rollers 23 carried at the other end. The rollers 23 engage and ride in a curved lower forward guide rail or guide member 24 attached to a vehicle body member 25, which surrounds the lower portion of the door opening 19.

The third point of attachment includes a rear mid-level, bracket and roller assembly shown generally at reference numeral 26, which includes an arm 27 (FIG. 7), with one end of the arm 27 being fixedly attached to the rear end of the door 12 pivotally attached at the other end 28 to one end of a link 29. The other end of the link 29 carries a plurality of rollers 30. The rollers 30 engage and ride in a curved rear guide rail or member 31 that is carried on the outside of the side wall 20, at an intermediate level, approximately midway between the levels of the upper and lower guide rails 17 and 24, respectively. The guide members 17, 24, and 31 curve adjacent their forward ends toward the inside of the van 10.

Figure 3:
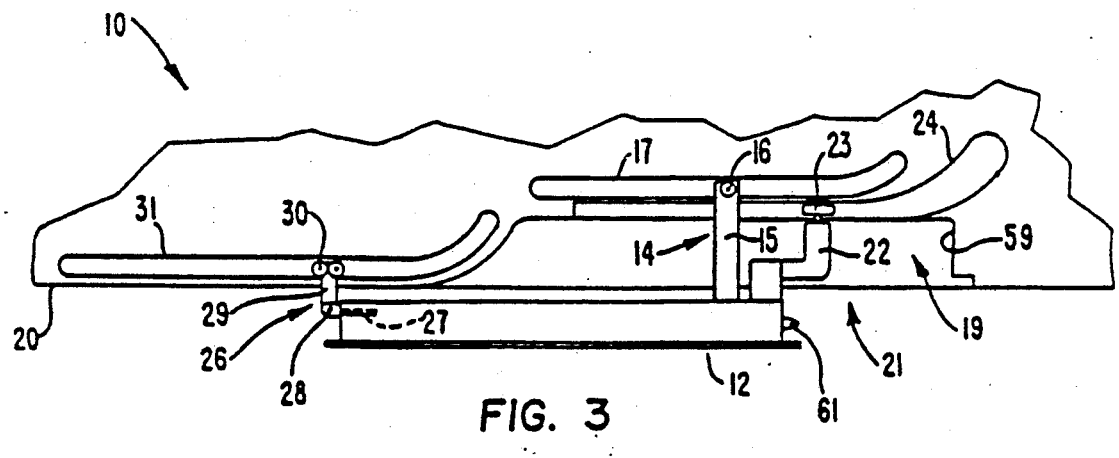
FIGS. 3, 4, and 5 are each diagrammatic views, illustrating the path of movement followed by the sliding door relative to its supporting guide rails during closing of the door.
Figure 4:
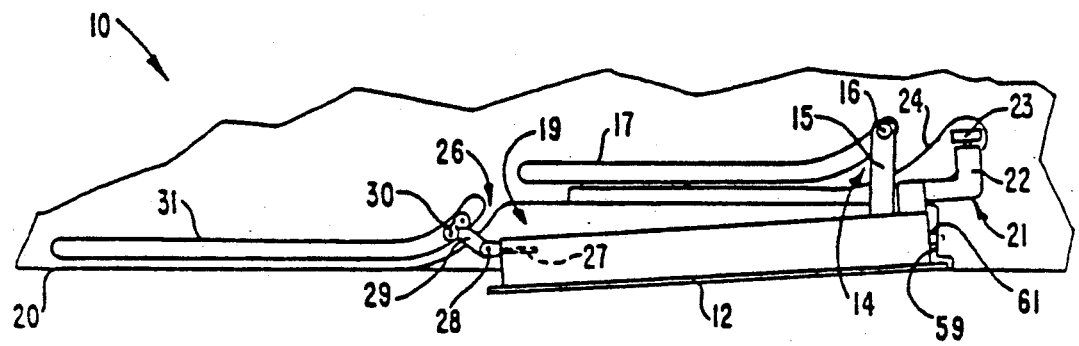
Figure 5:
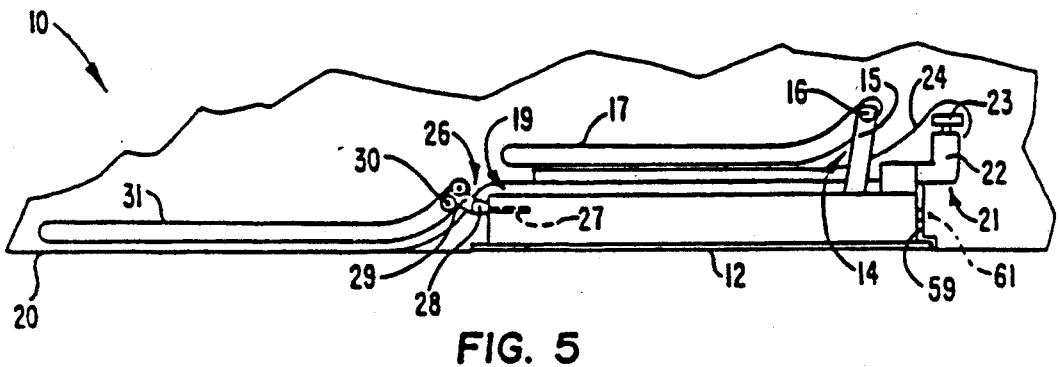

The above-discussed three points of support allow the slide door 12 to be slidably moved forwardly and rearwardly along the guide members 17, 24, and 31, with the door 12 being guided by the guide members 17, 24, and 31, through initial closing and final opening movements that are generally parallel to the side wall 20 of the van 10, as shown in FIG. 3, and through final closing and initial opening movements that are generally toward and generally away, respectively, from the plane of the door opening 14, as shown in FIGS. 4 and 5.

Referring to FIG. 3, when the door 12 is opened fully to the left, or rear, relative to the guide members 17 24, and 31 the rollers 16, 23, and 30 are at the rear ends of their respective guide members 17, 24, and 31. When the door 12 is then moved to the right, or forward, its initial closing movement relative to the side wall 20 is essentially parallel to the side wall 20 for most of its traversing movement towards the door opening 19. As the door approaches the right hand ends of the various guide members 17, 24, and 31 the curved portions of the guide members 17 and 24 are initially encountered by the corresponding rollers 16 and 23 so that the forward end of the door 12 moves inwardly toward the door opening 19 before the rear end of the door 12 starts moving inwardly. Thus, the forward end of the door 12 engages the weather strip in the door frame before the rear end of the door 12, causing a pivoting action, as may be seen by comparing FIG. 4 with FIG. 5. As the rollers 30 of the rear bracket and roller assembly 26 move through the inwardly-curved, forward end portion of the guide member 31, the final closing movement of the door 12 is accompanied by movement of the rear portion of the door into the door opening 19, as shown in FIG. 5.

In FIGS. 6 through 13, a powered door operator or drive assembly 235 is shown and moves the sliding door 12 through its initial and final opening and closing movements. The door operator 235 includes a cable spool drive motor 202M interconnected with a mounting bracket 244, which is attached to the inside of the side wall 20 by way of one or more mounting tabs 36. When selectively energized, the motor 202M driving rotates a drive pulley or cable spool 238, through a clutch mechanism (not shown) coupled to the motor's gearing and output shaft (not shown). When the clutch mechanism is de-energized, or in an electrical system failure, the motor 202M and its associated gearing are disengaged from the cable spool 238, thus allowing manual operation of the door 12. Optionally an unclutched, high efficiency, back-driveable spur gear drive mechanism (not shown) may be employed with the motor 202M to rotate the cable spool 238, while still allowing for manual operation of the door.

Figure 10:
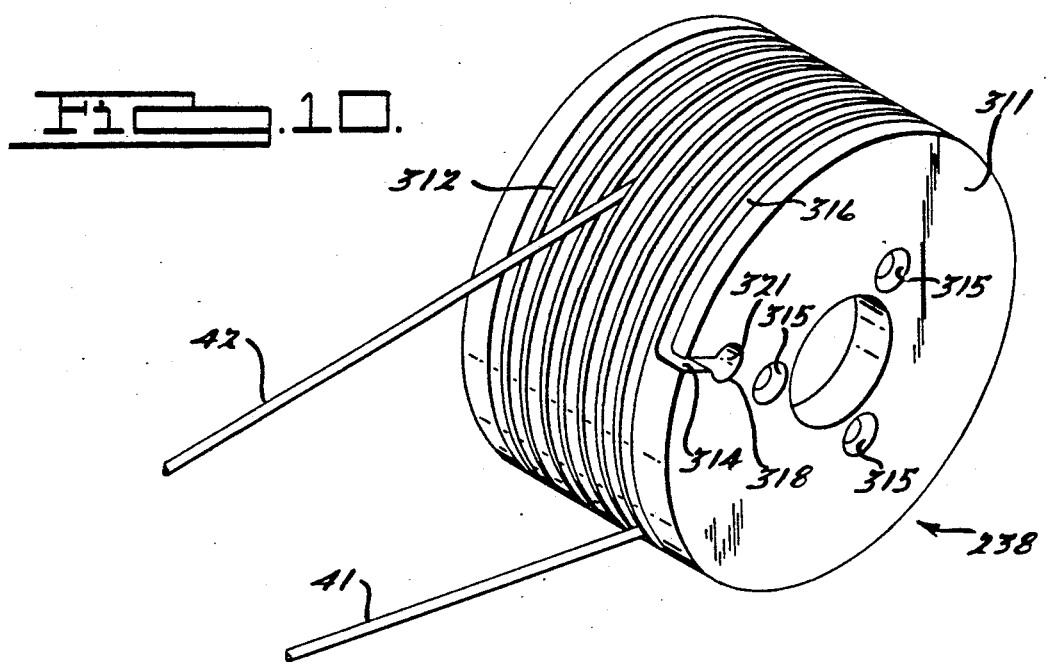
FIG. 10 is a perspective view of the cable spool and portions of associated cables of FIG. 9.
Figure 11:
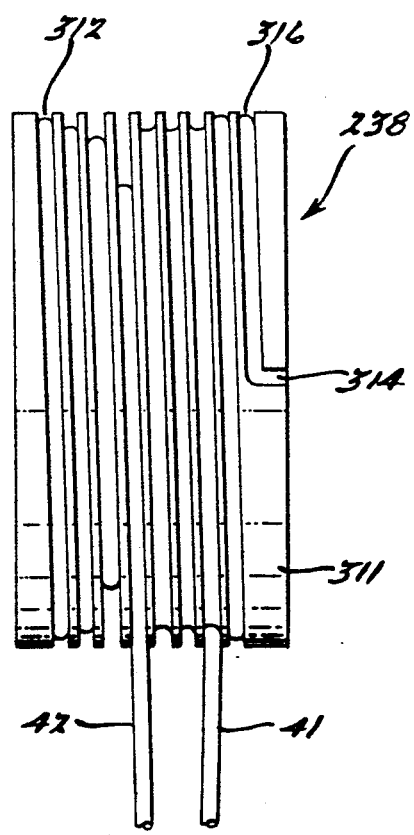
FIG. 11 is a top view of the cable spool, and portions of associated cables, of FIGS. 9 and 10.
Figure 12:
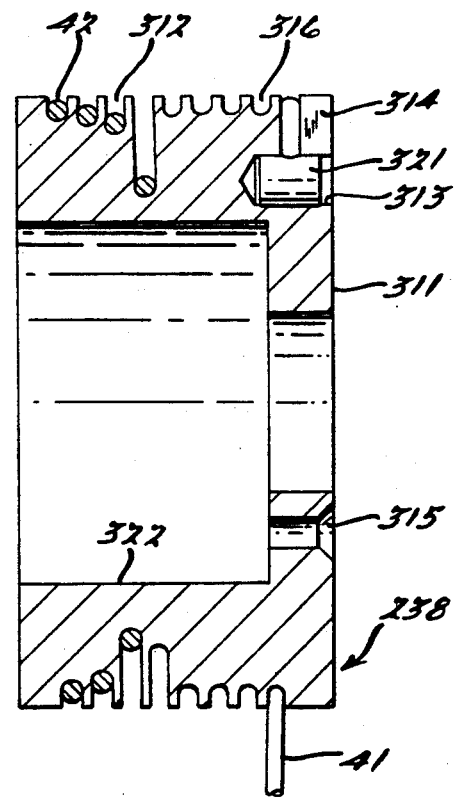
FIG. 12 is a radially-cut, cross-sectional view of the cable spool of FIGS. 9 through 11.

A lower flexible sheath or conduit 40 extends from a clamp 249 adjacent the cable spool 238 to a clamp member 149 attached to the lower portion of the inside wall 45 of the van 10, generally adjacent the forward end of the wheel well, and securely retains the forward end of the flexible sheath 40. The sheath 40 protects and guides a lower cable member 41 extending around the wheel well between the cable spool 238 and an idler pulley 152. One end of the cable member 41 is anchored on the cable spool 238, as shown in FIGS. 10 through 12, preferably by way of an enlarged cable retainer member 321 which is received and anchored in an opening 313 formed in a flange 311 of the cable spool 238. The opening 313 communicates with a series of helical grooves 316 and 312, by way of a slot 314 which allows the cable 41 to be wound onto a groove portion 312. The other end of cable member 41 passes around an idler pulley 152, and then proceeds through the lower guide member 24, over a wear strip 46 in the guide member 24, to an anchor point (not shown) on the forward lower bracket or arm 22 of the door 12, generally adjacent to roller 23.

An upper flexible sheath or conduit 43 extends from the clamp 249 adjacent the cable spool 238 to a clamp 148 attached to a mid-level location on the inside wall 45 of the van 10, generally adjacent the rear edge of door 12, at a vertical height generally corresponding to the height of the rear guide member 31. The clamp 148 securely holds the forward end of flexible sheath 43 to the wall 45 and protects and guides an upper cable member 42 as the cable member extends along the inside wall of the van 10, between the cable spool 238 and an idler pulley 48 about which it extends. One end (not shown) of the cable member 42 is anchored on the cable spool 238 in the same manner as described above in connection with the cable member 41. The cable member 42 then passes through the sheath 43, around the idler pulley 48, over a wear strip 47 at the forward end of the rear guide member 31, and along the rear guide member 31 (FIG. 7), through a grommeted opening 49 in the link 29 of the rear bracket and roller assembly 26, with its other end anchored on the link 29 by a number screw clamps 7, 8, and 9, for example.

As shown primarily in FIGS. 10 through 12, the cable spool 238 has an open, generally channel-shaped opening or groove, indicated by reference numerals 312 and 316, formed along a generally helical path on its outer circumferential edge. In contrast to the circular, or non-helical, groove configuration found on conventional drive pulleys, such as that shown in the above-mentioned U.S. Pat. No. 4,862,640, the helical groove configuration of the cable spool 238 avoids the "wrap-up" or "stacking" of the cables 41 and 42 within such a non-helical pulley slot, which undesirably results in an effective wrap radius that varies with rotation of the drive pulley in a manner that causes one of the cables 41 or 42 to be taken up, or paid out, at a rate that is inconsistent with the pay-out or take-up rate of the other cable at many, if not all, stages of powered door operation. These effects thus necessitated the inclusion of a spring-loaded drive pulley tensioning mechanism in the system of such above-mentioned patent in order to take up cable slack so as to maintain the required cable tension and compensate for differences in the travel or movement of the cables 41 and 42.

Thus, in order to avoid the above effects, the cable spool 238 includes the helical groove configuration discussed above and illustrated primarily in FIGS. 10 through 12. In addition, these effects are avoided in the illustrated exemplary embodiment and application of the present invention by the provision of a varying radial groove depth (resulting in a varying groove radius) along at least a portion of the helical groove path. In this exemplary embodiment, the radial depth of the groove portion 312 increases from left to right, as viewed in FIGS. 10 through 12, in order to vary the take-up rate, or the pay-out rate, of at least a portion of at least one of the cables 41 and 42, with respect to the rotation of the cable spool 238, as the cable spool 238 is rotated in respective opposite directions. The groove portion 316, however, has a generally constant radial depth, with the pay-out rate, or the take-up rate of the cables 41 and 42 correspondingly remaining generally constant with respect to rotation of the cable spool 238.

Figure 13:
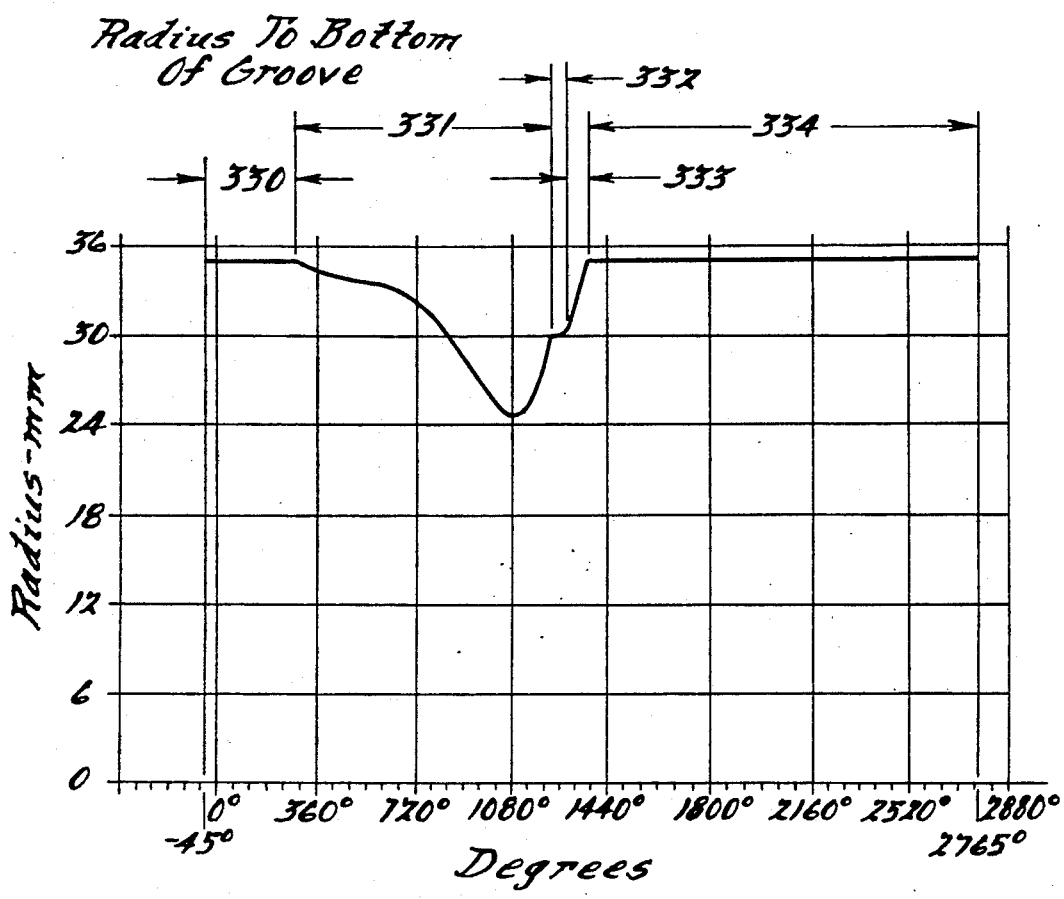
FIG. 13 is a plot of effective groove radius versus angular position of one preferred exemplary cable spool of FIGS. 9 through 12.

Thus, in the exemplary embodiment illustrated in the drawings, the required compensation for differences in speed or travel rates between the cables 41 and 42 at various stages of powered door operation is accomplished by way of the varying radial depth of the groove portion 312 and the generally constant radial depth of the groove portion 316. The relationship caused by such a configuration is illustrated in FIG. 13, wherein the groove radius for the cable spool 238 is plotted against angular rotational position. The portion 330 of the plot in FIG. 13 represents a constant radius part of the groove portion 316 for the lower cable 41, and corresponds to the open position of the door 12. The portion 331 of the curve represents a variable radius part of the groove portion 312 for the upper cable 42, and corresponds to a portion of the closing movement of the door 12, with the portion 332 of the curve corresponding to a constant radius portion of the groove for the upper cable 42 at the fully closed position of the door 12. The portion 333 of the curve corresponds to a generally linear transition between the portion of the helical groove for the upper cable 42 and the portion for the lower cable 41, and the portion 334 represents a constant radius portion of the groove for the lower cable 41.

The relationship of FIG. 13, showing the cable travel in the exemplary embodiment depicted in the drawings was derived empirically by measuring the position of the door 12 and each of the drive cables 41 and 42 at various stages of the door operation, moving the door in very small increments for each measurement. The empirical data was then fitted to a sixth-order polynomial equation and appropriate derivatives were taken to determine cable travel speed and acceleration equations in order to determine the proper parameters to be used in programming numerically-controlled machining equipment. As a result, the relationships depicted in FIG. 13 are only exemplary, and are shown for purposes of illustration only. One skilled in the art will now readily recognize that other similarly ascertainable relationships will be required for other powered door applications, or for other cable-actuated devices. It will be appreciated, though, that the principles of the present invention are also applicable to cable spools having one or more drive cables, to those having a variable radius (variable radial depth) helical groove along all, or a part of, the helical path, to those having variable-depth and constant-depth groove portions that are either continuous or discontinuous with one another, or to those that either extend in the same or opposite directions, and/or to those driven at either constant or variable speeds. One skilled in the art will also readily recognize that the cables 41 and 42 can be separate and distinct, each with its own cable retention arrangement on the cable spool 238, as described above, or that the cables 41 and 42 can optionally be continuous with one another, with a portion of the continuous cable being anchored to the cable spool in any of a number of ways known or readily ascertainable in the art.

Figure 9:
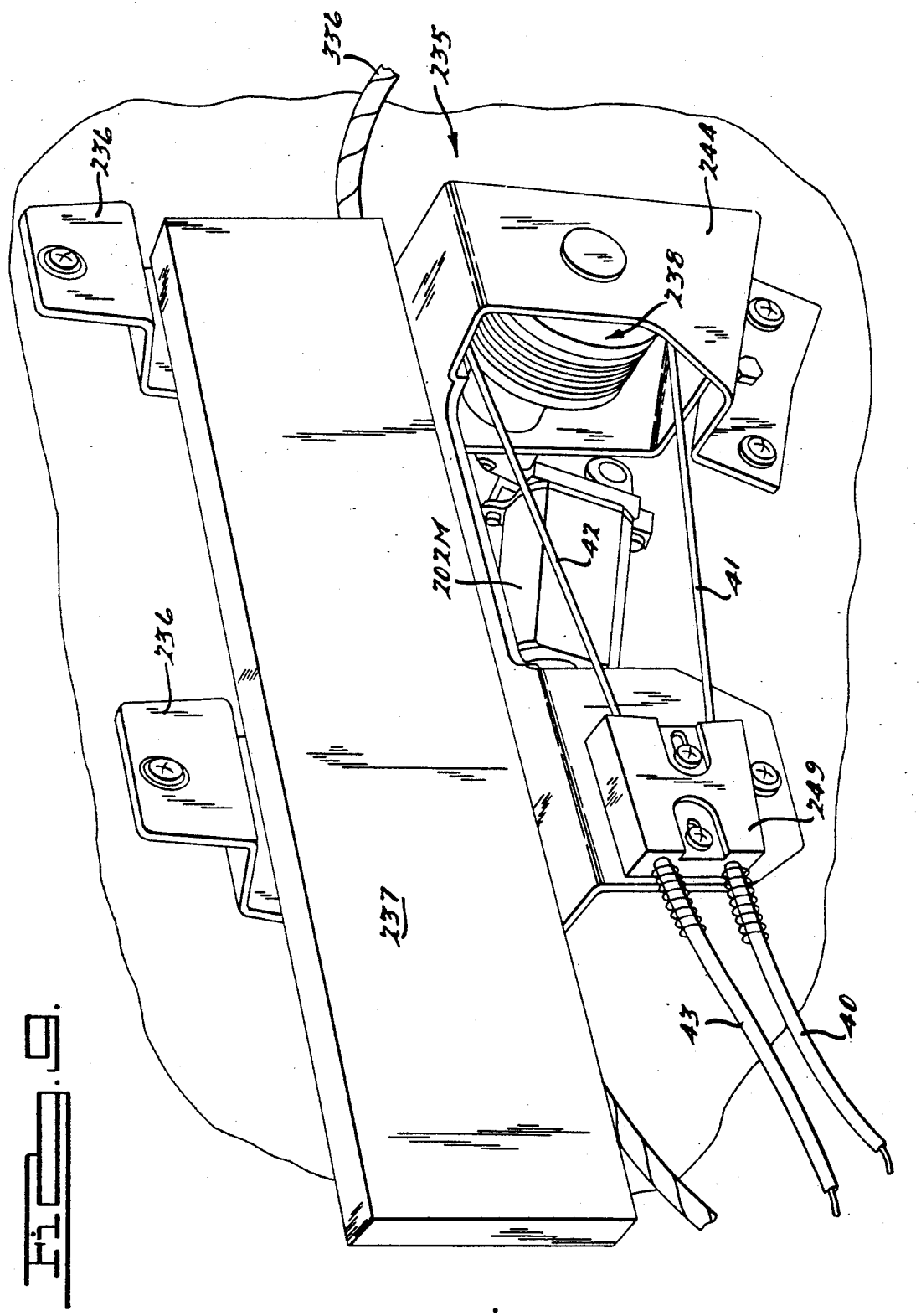
FIG. 9 is an enlarged perspective view, illustrating one preferred embodiment of a cable spool assembly according to the present invention.

Finally, the exemplary cable spool 238 in the drive arrangement or assembly 235 also includes a number of mounting holes 315, for securing the cable spool 238 to a drive hub or other such drive member (not shown) on the above-described motor-and-clutch mechanism, which is received within the drive member mounting opening 322 shown in FIG. 12 Also, the assembly 235 includes a power supply cable 336 and, preferably, a control cabinet or housing structure 237, as shown in FIG. 9.

Figure 6:
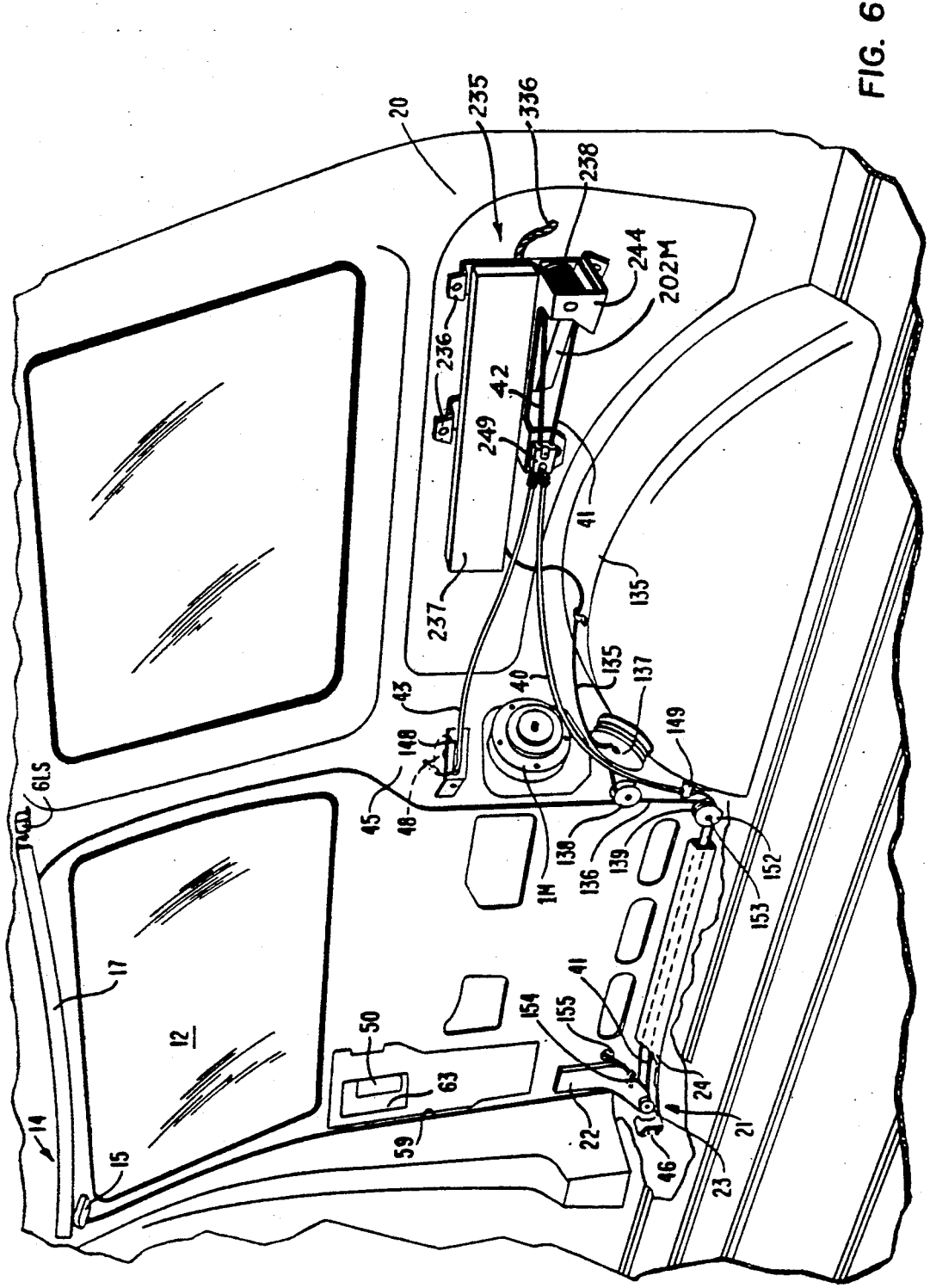
FIG. 6 is a perspective view of a portion of the interior of the van shown in FIGS. 1 and 2 with parts broken away for clarity, illustrating an embodiment of the invention in which a cable or cables are coupled to the forward end of the sliding door and to the rear end of the sliding door, and are actuated by an improved cable spool assembly according to the invention.
Figure 7:
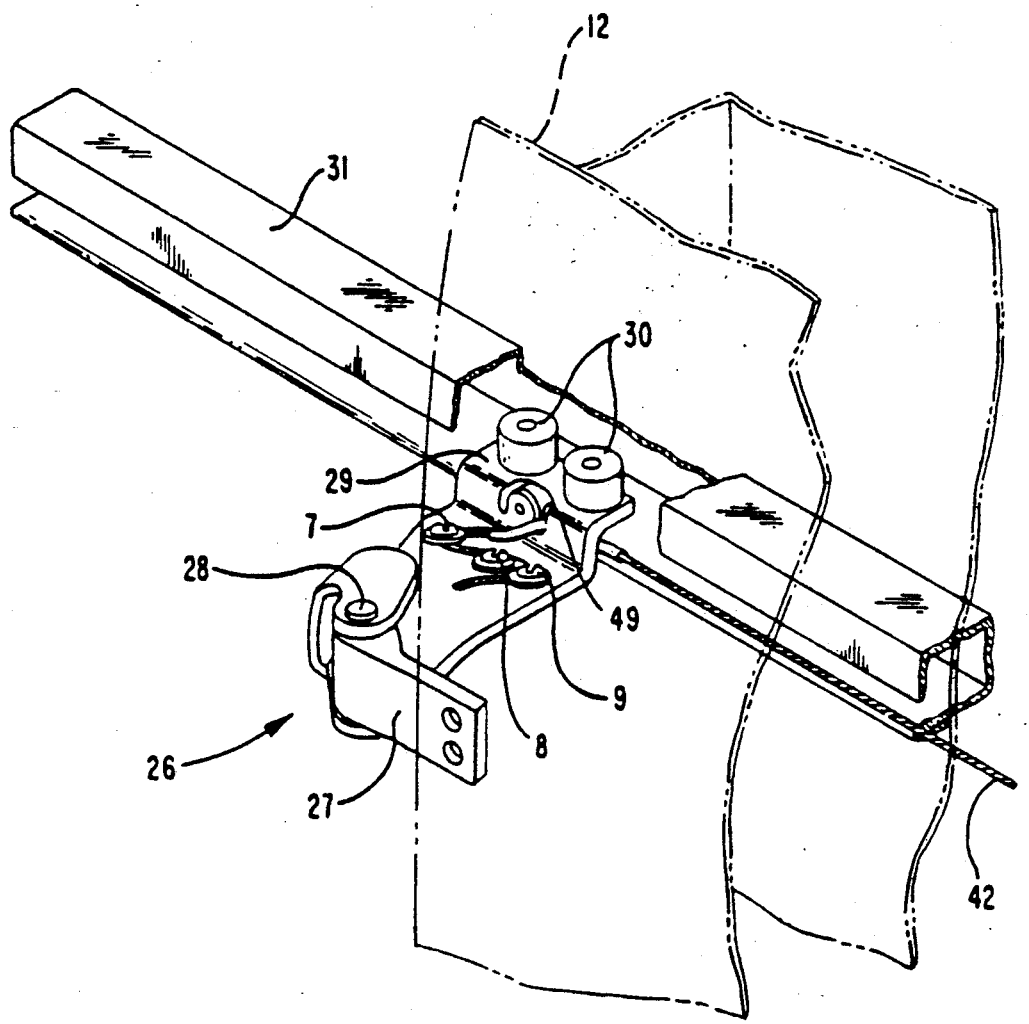
FIG. 7 is an enlarged detailed perspective view of a portion of the system illustrated in FIG. 6 showing the preferred manner in which a cable is fastened to a rear bracket and roller assembly carried at the rear end of the door.

As best seen in FIG. 6, the idler pulley 152 is fastened to the lower portion of the inside wall 45 of the van 10, generally adjacent the rear of lower guide member 24 (at the inner rocker panel) by a bolt 153. The bolt 153 also acts as the rotational axis and attachment point for an idler pulley 139, about which an electrical cord or cable 136 extends from a spring reel 137 and an idler roll 138 to the interior of the door 12. The electrical cable 136 passes through the lower guide member 24 to a clamp 154 on bracket 22 and then into the interior of the door 12 by way of an aperture 155. The electrical cable 136, whose function is described in more detail below, winds and unwinds from the reel 137 concurrently with the opening and closing movements of the door 12.

As the door 12 moves generally parallel to the vehicle body during closing, a guide pin 61 (FIG. 2) at the forward end of the door 12 moves into a conical recess (not shown) in a body member 59, which forms a forward end of the door opening 19. Referring to FIGS. 4 and 5, as the pin 61 engages the conical recess in the door frame 59, the rear of the door 12 begins a generally inward movement, and the motion of the door 12 becomes complex so that the lower cable member 41 does not pay out from the cable spool 238 at the same rate as does the upper cable member 42 being wound onto the cable spool 238 which accommodates or compensates for the different cable travels during final closing movement of the door, as is discussed above.

Referring to FIG. 6, with the door 12 in the closed position, the arm 22 of forward lower bracket and roller assembly 21 is positioned at its most forward and inward position on the lower guide member 24. The lower cable member 41 thus contacts the guide member 24 and, as the motor 202M and the cable spool 238 begin to open the door, the cable member 41 pulls the arm 22 rearwardly, and the lower cable member 41 rubs against the lower guide member 24. Accordingly, the outer face or contact area of the guide member 24 is covered with a friction-reducing wear strip 46 composed of a low-friction, highly wear-resistant material to prevent wear of both the cable member 41 and the guide member 24. Once the door is approximately one-quarter of the way open, however, the cable 41 moves freely within, but out of contact with, the lower guide member 24, from the arm 22 of the lower bracket and roller assembly 21 to the idler pulley 152. The cable is then smoothly guided by the flexible lower sheath or conduit 40 to the cable spool 238, where it is actively wound or unwound by the motor 202M. Friction wear of the lower cable member 41 is less during door closing than during door opening, because the cable member 41 is rather passively unwound from the drive pulley 38 as the door is moved forward (toward its closed position) by the upper cable member 42.

Figure 8:
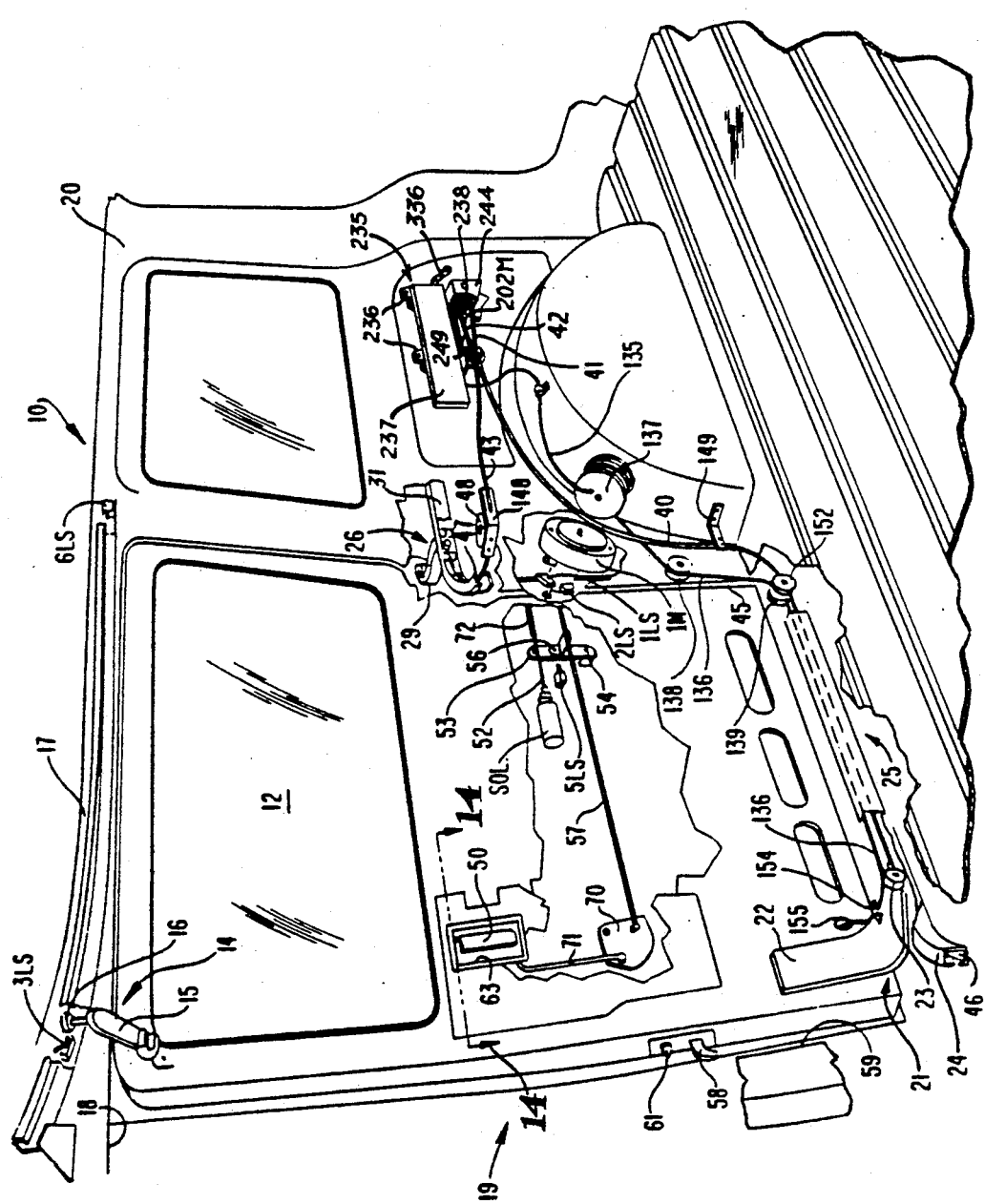
FIG. 8 is a perspective view of the interior of the van, similar to that of FIG. 6, but viewed from a different point inside the vehicle and showing the door in a partially open position.

As best seen in FIG. 8, and in contrast with the lower cable member 41, the upper cable member 42 contacts the forward portion of the guide member 31 during the full range of opening and closing movement of door 12. During door closing, the upper cable member 42 is actively wound onto the cable spool 238 by the motor 202M and conversely, during door opening, the cable member 42 is rather passively unwound from the cable spool 238. However, because of the above-mentioned contact with the guide member 31 during both opening and closing, a friction-reducing wear strip 47, similar to the wear strip 46, is provided on the outer face of the rear guide member 31.

It should be noted the upper cable member 42 moves around the guide member 31, toward the pulley 48, located generally inward of the door opening 19, and carries the bracket and roller assembly 26 and the rear end of door 12 along with it. Consequently, during the final closing movement of door 12, the upper cable member 42 imparts a generally inwardly-directed, low momentum closing force to the door 12. The inward movement of the rear end of the door 12, in turn, is accompanied by an engagement and latching of the latch bolt member 60 on the door 12 (FIGS. 2 and 20), with the striker pin 105 on the vehicle body member 45. Such latching engagement occurs just prior to final closing or clamping of the door 12 against the weather strip on the door frame, and is further described below. It should also be noted that when motor 202M is de-energized, and when the latch bolt member 60 and the striker pin 105 are not in latched engagement, the door 12 may be freely moved manually between its nearly closed position and its fully open position. This is because the motor 202M and the cable members 41 and 42 add little frictional resistance opposing such manual movement, and because no provision is made to lock the cable spool 238 when the motor is de-energized.

Figure 2:
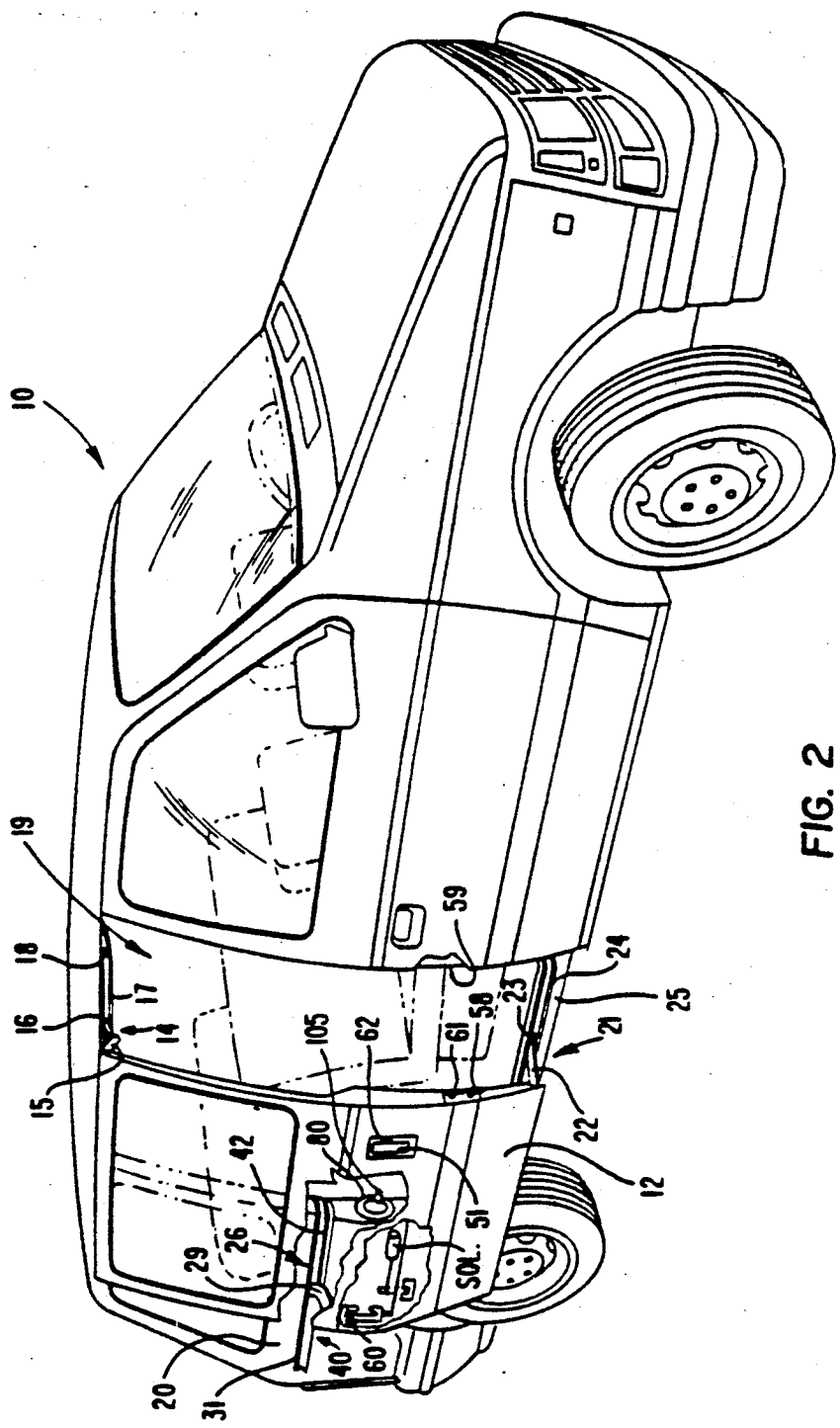
FIG. 2 is a view similar to FIG. 1 with parts broken away for clarity, showing the sliding door of the van in a partially open position.
Figure 14:
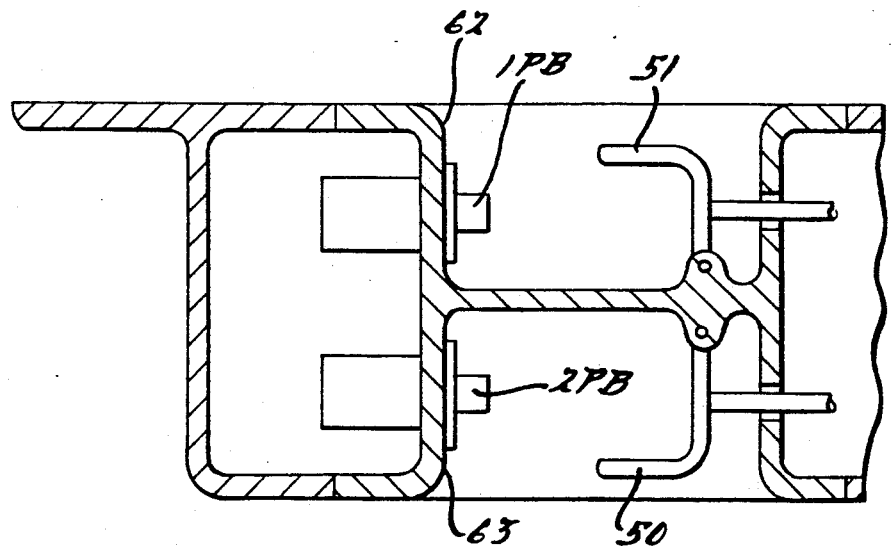
FIG. 14 is a sectional view, taken along the line 14—14 of FIG. 8, showing the locations of push button switches used in controlling the operation of the sliding door in one form of the powered door system.

As is perhaps most clearly shown in FIGS. 2, 8, and 14, the door 12 is provided with respective inner and outer handles 50 and 51, which are located in respective recesses 62 and 63 in the door 12. When the handles 50 and 51 are pulled to the rear (to the right as viewed in FIG. 8), they move a pull rod 71 upwardly, a pivot plate 70 in a clockwise direction, and a pull rod 57 forwardly. The forward movement of the pull rod 57 can also be initiated by an electrical solenoid SOL, the armature of which is connected to the forward end of a pull rod 52. A link 53, which is pivoted to the door 12 at 54, and to the rod 57 at pivot 56, is rotated about its pivot 54 when the pull rod 52 moves forward upon actuation of the solenoid SOL. The forward movement of the pull rod 52 causes the pull rod 57 to also move forwardly, due to the pivot connection 56 between the pull rod 57 and the link 53. The pull rod 57, in turn, is connected to the latch bolt mechanism of the door 12, as is shown generally at reference numeral 60 in FIG. 2. Accordingly, when either of the handles 50 and 51 is pulled to the rear, or when the solenoid SOL is energized, the pull rod 57 is moved to the left as viewed in FIG. 8, causing the latch bolt mechanism 60 to become unlatched, as is explained in greater detail below, and allowing the door to be either manually or automatically opened.

The movement of the pull rod 57 to its forward or unlatching position is sensed by a limit switch 5LS, which is actuated by contact with the link 53, and the limit switch 5LS in turn provides a signal to the electrical circuits indicating that the door handles 50 or 51 have been manually or electrically opened. The opening movement of the door handles 50 or 51 also opens a forward latch member 58, which engages a suitable latch receiving member (not shown) in the vehicle body member 59, generally at the forward end of the door opening 19.

As will be discussed in greater detail below the push buttons 1PB, 2PB, 3PB, and 4PB (FIGS. 1 and 14) are employed in initiating movement of the door 12 from its various positions. The push buttons 1PB and 2PB (FIG. 14) are positioned in the door recesses 62 and 63, respectively, and are employed in signalling the electrical circuits, from the location of door 12, to move the door from its open position to its nearly closed position. The push buttons 3PB and 4PB (FIG. 1) are positioned adjacent to the vehicle driver's seat to open and close, respectively, the door 12.

Various positions of door 12 relative to the door opening 19 are sensed by limit switches that are mechanically carried on upper forward guide member 17 and are electrically connected into the electrical control circuits of the door operating system. Thus, referring to FIG. 8, a limit switch 6LS is carried at the rear end of guide member 17 and is actuated when the door is at its fully open position, and a limit switch 3LS is carried at an intermediate position, near the forward end of the guide member 17, and is actuated when the door 12 reaches an intermediate position, about two inches from its nearly closed position. The arrival of the door at its nearly closed position is sensed by a limit switch 4LS (FIGS. 20 and 21), which is actuated when the latch bolt member 60 latches onto the striker pin 105. Referring to FIGS. 15A and 15B, the limit switch 3LS is mounted outboard of the guide member 17 and is preferably provided with a curved, rockable or pivotable actuator arm 75 that extends through a slot 76 in an outer wall 77 to the interior of the guide member 17. The actuator arm 75 is contacted and actuated by the roller 16 of the upper forward bracket 15 of the door 12 when the roller 16 passes over the arm 75. Thus any outwardly-directed forces exerted by the roller 16 as it passes by limit switch 3LS are taken up by the portion of the outer wall 77 surrounding the slot 76 in the guide member, while actuator arm 75 moves within the slot 76 and actuates and deactuates the limit switch 3LS as the roller 16 passes by during the opening and closing movements of the door 12.

Referring now to FIGS. 2, 8, and 16 through 22, one version of a final closing device or clamping mechanism, shown generally at reference numeral 80, is provided for moving the door 12 from its nearly closed position, at which the latch bolt member 60 latches onto the striker pin 105, to a fully closed position, at which the weather strip of the door 12 is compressed, and the door is fully closed, flush with the side wall 20. The final closing device 80 includes a motor 1M having an output shaft 81, on which an enlarged shaft extension or striker shaft 82 is mounted and keyed for rotation therewith. The striker shaft 82 is machined adjacent one end of its outer surface to provide a ratchet tooth 83 having a radially extending face 84. The radially inner and outer ends of the face 84 are connected by a smooth spiral cam surface 85.

The forward end of the outer surface of the striker shaft 82 also has a groove 86 machined therein so that a protruding cam surface 87 is provided relative to groove 86 at the outer surface of the striker shaft 82. The striker shaft 82 rotates within a bushing 88 that is press fit into an outer housing 89, and a thrust washer 90 seats against the rear end (right-hand end as viewed in FIG. 16) of the bushing 88 in a stepped recess 89a of the housing 89. The washer 90 separates the bushing from a collar or shoulder 91 formed at the rear end (right-hand end as viewed in FIG. 13) of the striker shaft 82.

A bracket plate 92 joins the motor 1M to the housing 89 and includes an opening 93, through which the collar 91 freely passes so that the striker shaft 82 abuts against a shoulder 94 on the motor shaft 81. The bracket 92 includes a plurality of small bolt holes 95, which align with corresponding threaded holes (not shown) on the back surface of the housing 89 to allow the bracket 92 to be rigidly fastened to the rear end of the housing 89 by bolts (not shown). Similarly, the bracket 92 is provided with a plurality of large bolt holes 96, which are in alignment with corresponding threaded bolt holes 97 at the forward end of the motor 1M. Bolts or other suitable fasteners (not shown) are employed to fasten the motor 1M to the opposite side of the bracket 92 from the housing 89 so that the various parts of the final closing device 80 are firmly interconnected.

A pair of limit switches 1LS and 2LS threadedly engage corresponding threaded openings 98 and 99 in the housing 89. The openings 98 and 99 are aligned with corresponding openings 98a and 99a in the bushing 88 so that the actuators 100 and 101 of the respective limit switches 1LS and 2LS ride in the groove 86 of the striker shaft 82 and are actuated by the protruding cam surface 87 during rotation of the striker shaft 82, as will be explained in greater detail below.

A pawl 102, a spring 103 and a lockbolt 104 are carried in an aperture 104a in the housing 89. The aperture 104a is aligned with an aperture 104b in the bushing 88 so that the pawl 102 is spring loaded downwardly into engagement with the spiral cam surface 85 on the outer surface of the striker shaft 82. During clockwise rotation of striker shaft 82 (as viewed in FIG. 16), the pawl 102 rides up the spiral cam surface 85 until it reaches the top of the tooth 83 and then drops down into engagement with the radial face 84 of the tooth 83. This engagement represents the fully closed or clamping position of the final closing device 80, which is shown in FIG. 18, and coincides with the actuation of the limit switch 2LS by cam 87. The unclamped or open position of the final closing device 80 is illustrated in FIG. 17 and coincides with the actuation of the limit switch 1LS by the cam 87.

The final closing device 80 is provided with a striker pin 105, which projects axially outwardly from an end surface 106 of the striker shaft 82. The end surface 106 constitutes a striker plate on which the striker pin 105 is eccentrically supported relative to the rotary axis of the shaft extension 82. The end of the striker pin 105 remote from the surface 106 is provided with a flange or enlarged head portion 107 for crashworthiness purposes. Preferably, the flange 107 is capable of preventing the latch bolt mechanism 60 on the door 12 from axially pulling free of the striker pin 105 during high impact axial loads.

The end of the housing 89 remote from the motor 1M is provided with a reduced diameter threaded end portion 108, which is threadedly engaged by mounting nut 109. The end portion 108 is passed through one side of a corresponding opening in the rear body member 45 of the door opening and is bolted thereto by tightly threading the mounting nut 109 onto the end portion 108 from the other side of the body member. A key and slot arrangement (not shown) may optionally be provided to insure that the clamping mechanism housing 89 does not rotate relative to the frame member 45.

Figure 17:
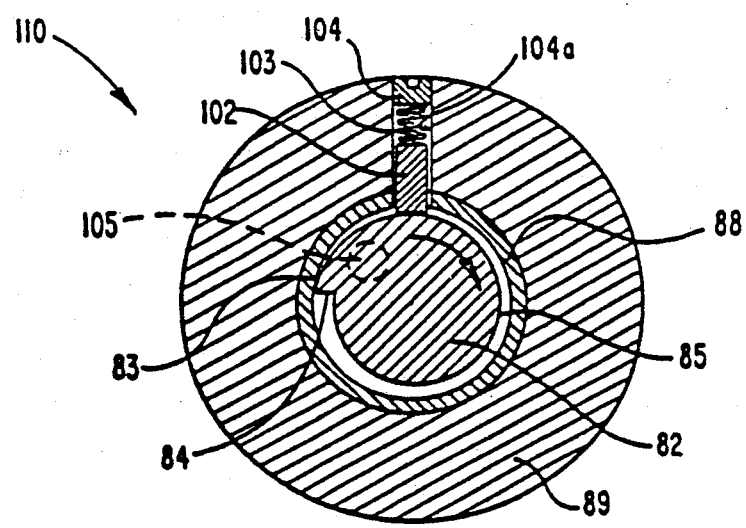
FIGS. 17, 18, and 19 are enlarged sectional views, taken through a mechanism in FIG. 16 for precluding reverse rotation of the striker plate, and showing the relationship of a pawl to a single tooth ratchet wheel thereof when the striker pin is in its extended position, in its retracted position, and between its retracted and extended positions, respectively.
Figure 18:
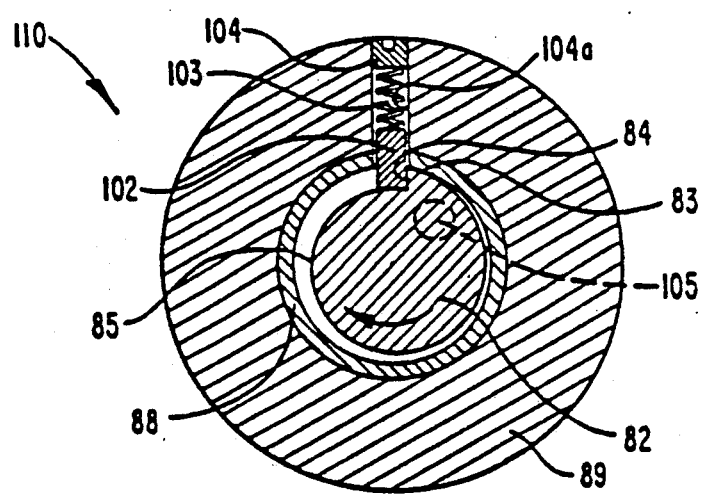
Figure 19:
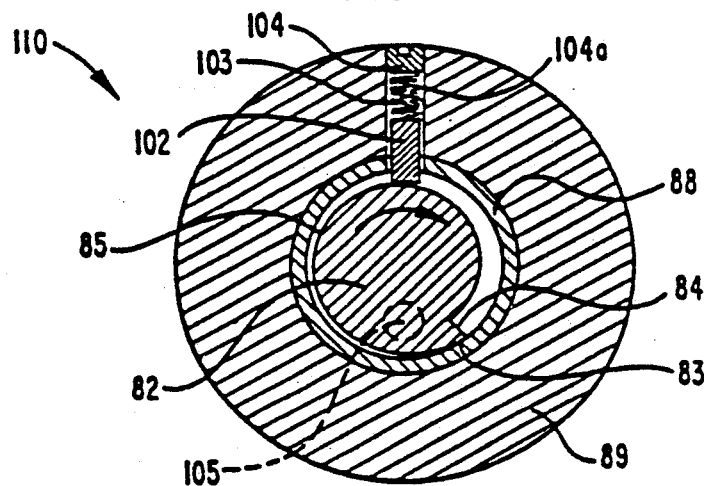
Figure 20:
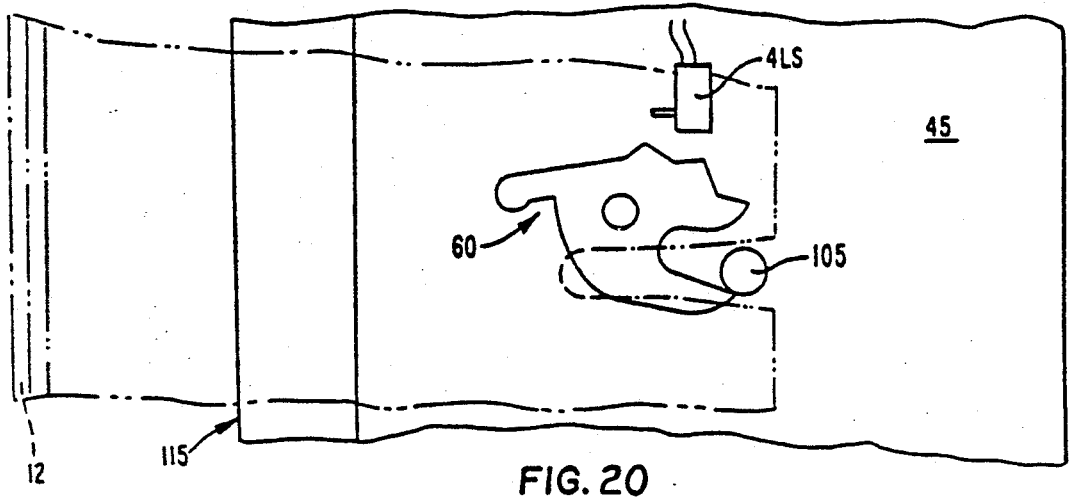
FIGS. 20, 21, and 22 are diagrammatic elevation views, taken through a latch bolt mechanism of the door and the final closing mechanism on the door frame showing the relationship of the latch bolt member and striker pin to the weather strip on the vehicle body during various respective stages of door closing.
Figure 21:
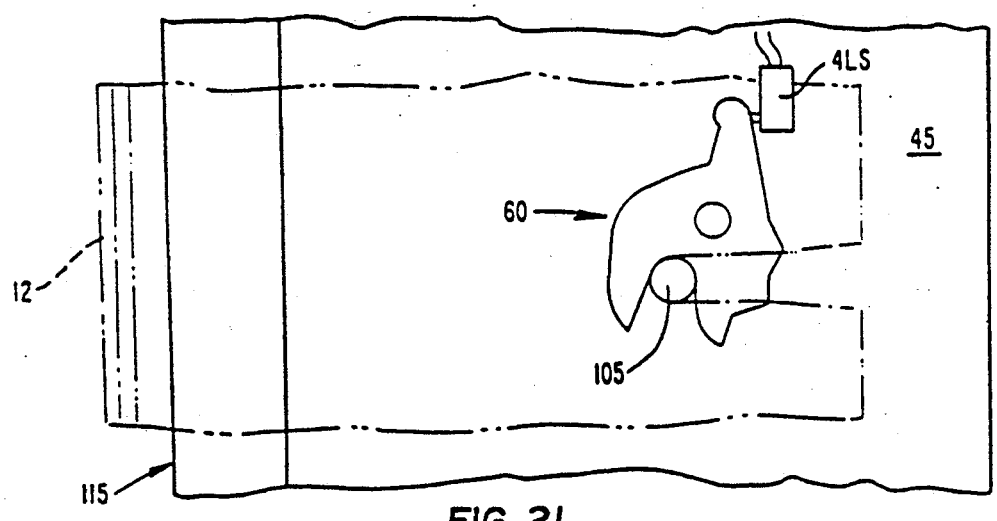
Figure 22:
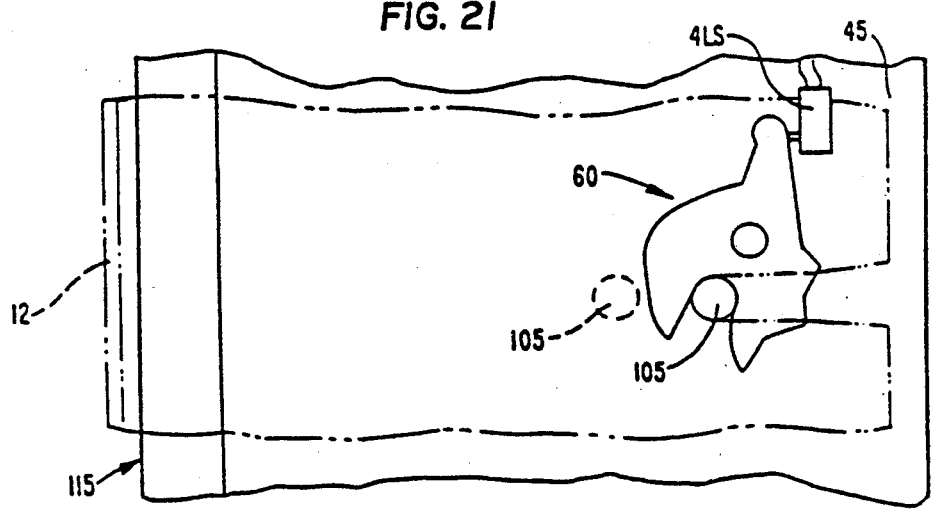

Referring to FIGS. 17 through 19, the various components 82 through 85, and 102 through 104, cooperate to form a unidirectional lock, shown generally at reference numeral 110. The unidirectional lock 110 serves to prevent reverse rotation or back-driving of the striker pin 105 in the event that the fully closed door is impacted from the inside under high loads. As shown in FIG. 17, the striker pin 105 is extended to its fully open or unclamped position, awaiting both the arrival of the latch bolt mechanism 60 (FIG. 8) and the movement of the latch bolt mechanism 60 to its latched condition, prior to undergoing rotary motion, which retracts the striker pin 105 and moves the door to its fully closed, clamped position. This extended condition of striker pin 105 is also represented in FIGS. 20 and 21, with the latch bolt mechanism 60 shown in its unlatched condition prior to engagement with the striker pin 105 in FIG. 20, and with the latch bolt mechanism 60 shown in its latched condition in full engagement with the striker pin 105 in FIG. 21. When the latch bolt mechanism 60 fully engages and latches onto the striker pin 105, it actuates a limit switch 4LS, which signals the electrical control system that the latch bolt mechanism 60 is fully latched. In turn, the electrical circuits then cause the motor 1M to drive the striker pin 105 from its extended position (shown in dashed lines in FIG. 22), to its retracted position (shown in solid lines in FIG. 22). This movement is occasioned by movement of the door 12 to its fully closed position, in which the door compresses the weather strip 115 against the vehicle body members constituting the frame of the door opening 19. Such movement is also occasioned by clockwise rotation of the striker shaft 82 from the position shown in FIG. 17 to the position shown in FIG. 18, at which the pawl 102 has dropped into place behind the ratchet tooth 83 and is abutted by the face 84 of the ratchet tooth 53.

If the fully closed door 12 is impacted from the inside under a high load, such as during a vehicle crash, the unidirectional lock 110 will resist reverse rotation or back driving of the striker pin 105 to prevent accidental, unintended opening of the door. This occurs as a result of the pawl 102 being in a face-to-face confronting engagement with the face 84 of ratchet wheel tooth 83.

As shown in FIG. 19, the striker pin 105 is moved from its retracted position to its extended position by clockwise rotation of the shaft 82. This rotation is initiated by the electrical circuits of the powered door operating system after a door opening cycle has been initiated by the operator and the latch bolt mechanism 60 has cleared the striker pin 105, as will be discussed in greater detail below.

Figure 23:
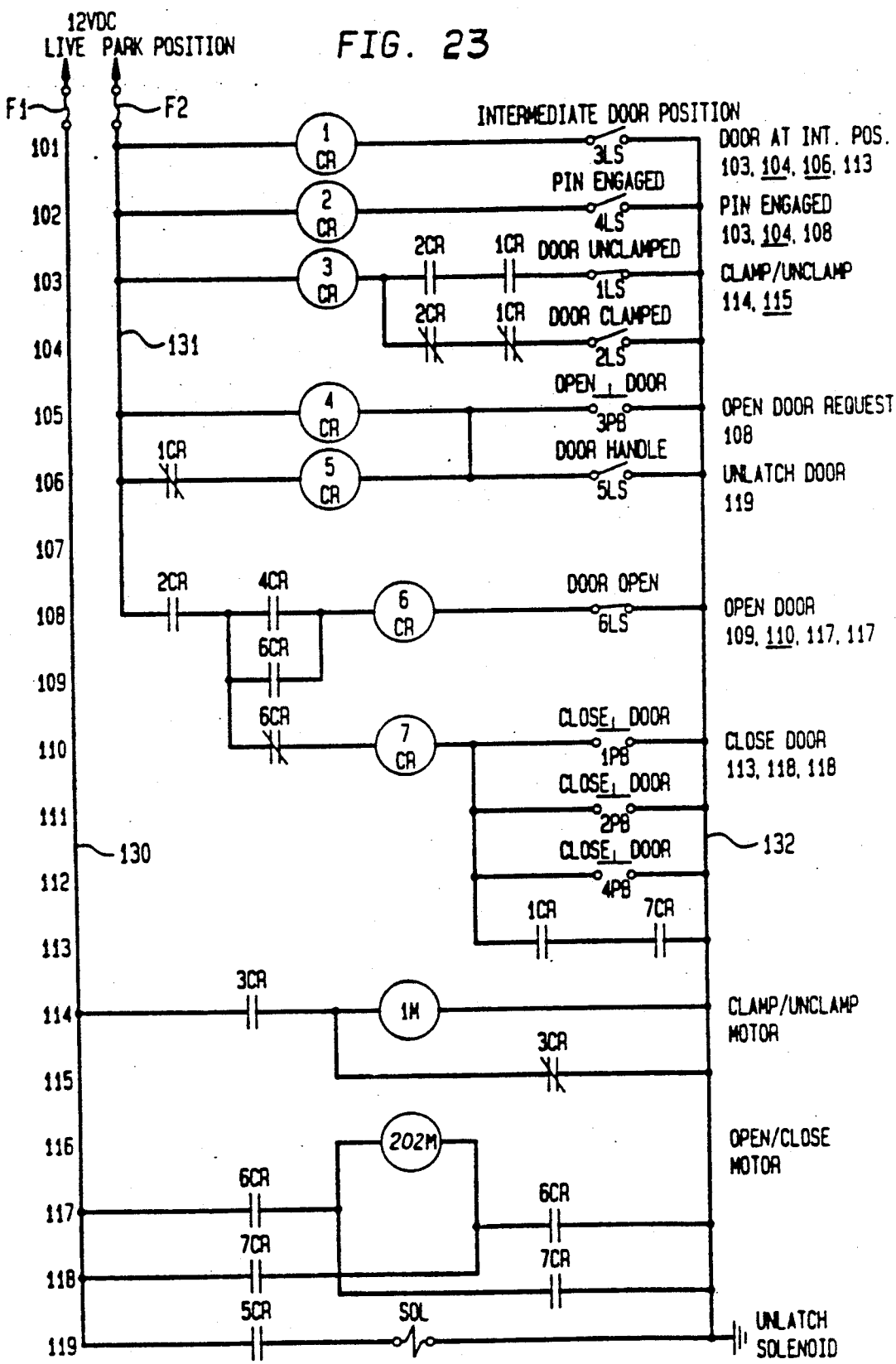
FIG. 23 is a schematic circuit diagram of an electrical system that may be employed in controlling the operation of the powered sliding door operating system.

Referring now to FIG. 23, which illustrates a circuit diagram of the electrical control system for controlling the normal operation of the powered sliding door operating system, with the electrical circuitry of the door reversing apparatus of the present invention being schematically illustrated separately in FIG. 24 and discussed in more detail below. In FIG. 23, a line numbering system has been employed to facilitate the description of the electrical system, with the line numbers being listed on the left side of FIG. 23 and running consecutively from line No. 101 through line No. 119. The line numbers on which the contacts of relays appear have been listed to the right of the relays that control them, and normally closed contacts are indicated by underlining in the listings. Thus referring to FIG. 23, relay 3CR (line 103) is provided with two sets of contacts, a normally-open set of contacts in line 114 and a normally-closed set of contacts in line 115.

Twelve volt DC voltage is supplied from the automobile battery (not shown) to the electrical control system of the powered sliding door operating system by way of a fuse F1 and a conductor 130. Twelve volt DC voltage is also supplied to the electrical control system through a transmission lever switch (not shown) via a fuse F2 and a conductor 131. The conductor 131 is energized only when the transmission lever is in either the park or neutral position. A conductor 132 is connected to the grounded side of the battery to complete the circuit across the electrical control system.

TABLE I below lists and describes the functions of the various push buttons, limit switches, solenoids, and motors used in the electrical control system circuits for controlling the powered sliding door operating system.

TABLE I

| Components | DESCRIPTION OF COMPONENTS Description |
|---|---|
| 1LS | Normally closed; opens when striker pin rotates to fully extended (unclamped) position. |
| 2LS | Normally closed; open when striker pin rotates into its retracted (clamped) position. |
| 3LS | Open when the door is forward of its intermediate position, and closed when the door is rearward of its intermediate position. |
| 4LS | Normally closed; opens when latch member moves to fully closed (latched) position. |
| 5LS | Normally open; closes when door handle is pulled open or when solenoid SOL is energized. |
| 6LS | Normally open; opens when door reaches fully open position. |
| 1PB | Normally open; manually closed to close door from outside of vehicle. |
| 2PB | Normally open; manually closed to close door from inside rear of van. |
| 3PB | Normally open; manually closed by operator of |

TABLE I-continued

| Components | DESCRIPTION OF COMPONENTS Description |
|---|---|
| | vehicle to open door from the driver's station. |
| 4PB | Normally open; manually closed by operator to close sliding door from the driver's station. |
| SOL | A solenoid connected to the door opening mechanism for unlatching the latch bolt mechanism and holding the latch bolt mechanism open, while energized. |
| 1M | Motor for moving the striker pin between its extended and retracted position to move the door from its unclamped position to its clamped position. |
| 202M | Motor for driving the cable spool and moving the door between its fully open and nearly closed positions. |

Referring to FIG. 23 in conjunction with FIGS. 6 and 8, the electrical circuits of the powered sliding door operating system are shown in the condition they assume when the door is in its fully closed, fully clamped condition. Starting from this condition, a full door opening, and then a full door closing, cycle will be considered.

With the door in the fully closed and clamped position the operator manually actuates the door handle 50, closing the limit switch 5LS (line 106), or presses the push button 3PB (line 105). Accordingly, a control relay 4CR (line 105) energizes closing its contacts in line 108 and a control relay 5CR (line 106) energizes, closing its contacts in line 119. The closing of the contact 4CR in line 108 preconditions the control relay 6CR for subsequent energization when control relay 2CR energizes. The closing of the contacts 5CR in line 119 causes the solenoid SOL to energize to mechanically hold the door handle 50 in the open position, retaining the limit switch 5LS in its actuated condition and retaining its contacts 5LS in line 106 closed. The opening of the door handle 50 and the energization of the solenoid SOL cause the latch bolt mechanism 60 to unlatch, which, in turn, causes the limit switch 4LS (FIG. 20) to deactuate, closing its contacts 4LS in line 102. It should be noted that the unlatching of the latch bolt mechanism 60 frees the door to move from its clamped position, or fully closed position, to its unclamped position, or nearly closed position, due both to the resulting expansion of the compressed weather seal strip and to the door opening movement initiated by way of the motor 202M, as described below.

The closing of the contacts 4LS in line 102 causes the control relay 2CR (line 102) to energize, opening its contacts 2CR in line 104 and closing its contacts 2CR in lines 103 and 108. The closing of the contacts 2CR in line 103 and the opening of the contacts 2CR in line 104 are without further effect at this time. The closing of the contacts 2CR in line 108 causes the control relay 6CR (line 108) to energize through the now-closed contacts 4CR in line 108. Accordingly, the contacts 6CR in line 109 close, bypassing the contacts of the relay 4CR in line 108, the contacts 6CR in line 110 open, without further effect at this time, and the two sets of contacts 6CR in line 117 close, thus energizing the motor 202M (line 116) for driving the door 12 from its fully or nearly closed position toward its fully open position.

As the door 12 moves away from its nearly closed position to its intermediate position, the limit switch 3LS actuates and its contacts 3LS (line 101) close, energizing the relay 1CR (line 101). Accordingly, the contacts 1CR in line 103 close, energizing the control relay 3CR (line 103) through the now-closed contacts 2CR in line 103, the contacts 1CR in line 104 open, without further effect at this time the contacts 1CR in line 106 open, de-energizing the control relay 5CR (line 106), and the contacts 1CR in line 113 close, without further effect at this time. The de-energization of the control relay 5CR (line 106) opens the contacts 5CR in line 119, de-energizing the solenoid SOL (line 119). Accordingly, the door handle resumes its unpulled condition, and the contacts 5LS (line 106) open, thus de-energizing the control relay 4CR without further effect (since the contacts 4CR in line 108 open, but are by-passed by the contacts 6CR in line 109).

This energization of the control relay 3CR (line 103), due to the closing of the contacts 1CR in line 103 (while contacts 2CR in line 103 were closed) causes the contacts 3CR in line 114 to close and the contacts 3CR in line 115 to open. Accordingly, the motor 1M (line 114) becomes energized and starts rotating the striker pin 105 from its retracted position toward its fully extended position. During the rotation of the motor 1M, the limit switch contacts 2LS (line 104) close as the striker pin starts rotating out of its retracted position, but this action is without further effect since the relay 2CR is energized and its contacts in line 104 are open. When the striker pin 105 rotates to its fully extended (unclamped) position, the limit switch contacts 1LS (line 103) open, de-energizing the control relay 3CR (line 103). With the de-energization of the control relay 3CR (line 103), its contacts 3CR in line 114 open and its contacts 3CR in line 115 close. Accordingly, the input side of the motor 1M is de-energized and grounded, braking the motor and stopping the movement of the striker pin 105 in its extended (unclamped) position.

Then the door 12 eventually arrives at its fully open position, at which the time limit switch 6LS actuates, opening contacts 6LS in line 108 to de-energize the control relay 6CR (line 108). Accordingly, the two sets of normally open contacts 6CR in line 117 open, thus de-energizing the motor 202M, the normally open contacts 6CR in line 109 open without further effect, and the normally closed contacts 6CR in line 110 close without further effect, but preconditioning line 111 for subsequent closing operations. Thus the door is now in its fully open condition, with the latch bolt mechanism 60 unlatched, and with the clamping mechanism 80 open, or unclamped, ready for a door closing cycle to be initiated.

To initiate the portion of the door closing cycle that moves the door 12 from its fully open position to its intermediate position, one or another of the push buttons 1PB (line 110), 2PB (line 111) or 4PB (line 112) is depressed. The push buttons 1PB and 2PB are physically located adjacent to the door handle 50, while the push button 4PB is controlled by the driver of the vehicle at the driver's location. When any one of the push buttons 1PB (line 110), 2PB (line 111), or 4PB (line 112) is depressed, their corresponding contacts close, energizing the control relay 7CR (line 110). Accordingly, the contacts 7CR in line 113 close, locking the relay 7CR in an energized condition independently of the push button contacts in lines 110, 111, and 112, since the contacts 1CR in line 113 are closed. In addition, the two sets of normally open contacts 7CR in line 118 close with the energization of the relay 7CR to energize the motor 202M with a polarity that causes the motor 202M to drive the cable spool and thus the door 12 in a closing direction, from its fully open position toward its intermediate position.

The initial closing movement of the door 12 from its fully open position toward its intermediate position results in the limit switch 6LS deactuating, causing its contacts 6LS in line 108 to close without further effect since the contacts 4CR and 6CR in lines 108 and 109, respectively, are open. The door 12 thus continues to move toward its intermediate position and, upon arrival at the intermediate position, the limit switch 3LS (line 101) opens, de-energizing the control relay 1CR (line 101), causing its contacts in line 103 and line 113 to open, and causing its contacts in line 104 and line 106 to close. The opening of the contacts 1CR in line 103 is without further effect because the contacts of the limit switch 1LS in that line are already open. The closing of the contacts 1CR in line 104 is without further effect because the contacts of the relay 2CR in that line are open. The opening of the contacts 1CR in line 106 is without further effect since the push button 3PB (line 105), the limit switch 5LS (line 106), and the limit switch 7LS (line 107) are all open. The opening of the contacts 1CR in line 113 de-energizes the control relay 7CR (line 110) and opens its contacts 7CR in line 113 without further effect, and further opens its two sets of contacts 7CR in line 118. The opening of the two sets of contacts 7CR in line 118 de energizes the motor 202M, stopping the door 12 at the intermediate position.

Accordingly, the door 12 arrives at its intermediate position and the electrical circuits assume a condition awaiting further closing signals at that position. At this time, further closing movement of the door 12 under the control of any of the push buttons 1PB, 2PB or 4PB requires the respective button to be maintained in its depressed condition in order to continue moving the door 12 toward its fully closed position. This is due to the fact that the control relay 1CR (line 101) is de-energized and its contacts 1CR in line 113 are open, thus preventing energization of relay 7CR through any path other than through the closing of the contacts 1PB (line 110), 2PB (line 111), or 4PB (line 112).

Assuming that one of the push buttons 1PB, 2PB, or 4PB is depressed to continue the closing movement of the door 12 from its intermediate position towards its nearly closed position, the control relay 7CR (line 110) energizes and, in turn, energizes the motor 202M by way of its two sets of contacts 7CR in line 118. Accordingly, while the selected push button 1PB, 2PB, or 4PB is being depressed, the door 12 continues to move toward its nearly closed position. The continued movement of the door 12 causes the latch bolt mechanism 60 to engage and then to latch onto the extended striker pin 105 of the clamping mechanism 80. Accordingly, the limit switch 4LS (line 102) actuates, opening its contacts in line 102 and de-energizing the control relay 2CR (line 102). As a result of this, the contacts 2CR in line 103 close without further effect, and the contacts 2CR in line 108 open, thus de-energizing the relay 7CR (line 110). Accordingly, the two sets of contacts 7CR in line 118 open, stopping the motor 202M, with the door 12 located between its nearly closed and fully closed positions. In addition, such de-energization of the control relay 2CR (line 102) causes its contacts 2CR in line 104 to close, energizing the control relay 3CR (line 103) through the now-closed contacts 1CR and 2LS in line 104. The energization of the control relay 3CR (line 103) causes its normally open contacts in line 114 to close and its normally closed contacts in line 115 to open. Accordingly, the motor 1M becomes energized and starts driving the striker pin 105 of the clamping mechanism 80 from its extended position to its retracted position thereby moving the door 12 from its unclamped condition to its fully clamped position.

The initial movement of the striker pin 105 from its extended position toward its retracted position causes the contacts of the limit switch 1LS in line 103 to close without further effect, because the contacts 1CR in line 103 are open at this time. When the striker pin 105 reaches its fully retracted position, and the door 12 is in its fully clamped condition, the limit switch contacts 2LS of line 104 open, de-energizing the control relay 3CR (line 103). Accordingly, the contacts 3CR of line 114 open, and the contacts 3CR of line 115 close, thus grounding the input to the motor 1M of line 114 and causing the motor 1M to brake to a stop, with the striker pin 105 in its fully retracted position, and the door 12 fully clamped. At this point, the door 12 is fully closed, and the electrical circuits are back to the initial condition described above.

Figure 24:
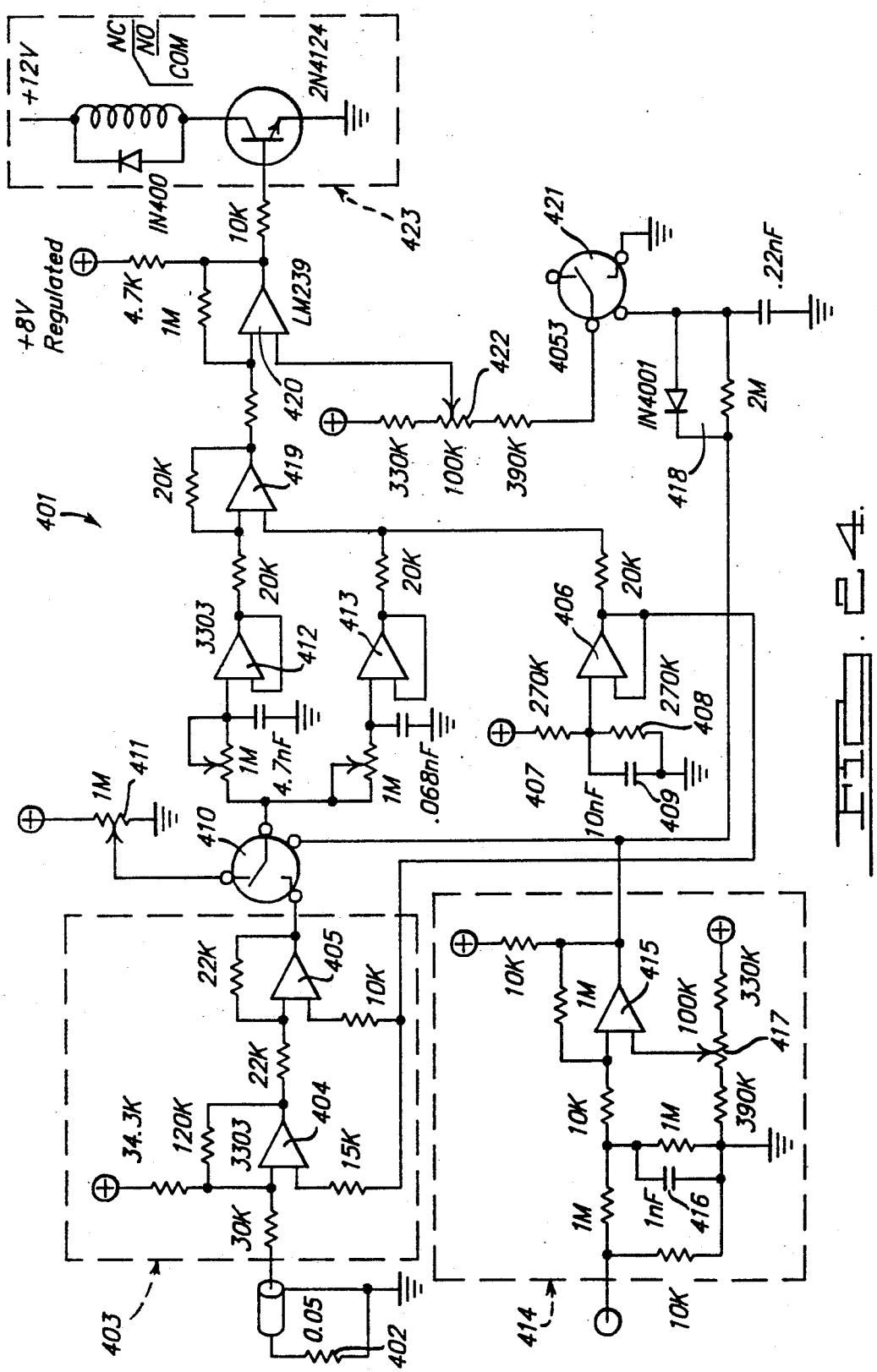
FIG. 24 is a schematic circuit diagram of an electrical door reversing apparatus for causing the closing door to stop and reverse to an opening movement when the apparatus detects the presence of an obstruction.

In FIG. 24, a schematic circuit diagram for an exemplary embodiment of a reversing apparatus according to the present invention is shown with exemplary component values, for purposes of illustration only. One skilled in the art will readily recognize that the principles of the present reversing apparatus invention are equally applicable to circuitry other than the particular circuitry illustrated in FIG. 24, as well as to power actuator devices other than that of the exemplary vehicle door application shown in the drawings and discussed herein.

In FIG. 24, an exemplary reversing apparatus circuit 401 includes a resistor 402, which can be a 0.05 ohm resistor for the 12 volt DC power supply in the vehicle door operator system described above, for example. The resistor 402 is wired between the ground and one side of the above-mentioned drive motor 202M in such a way as to be in series with the drive motor 202M during door closing. A level shifting stage 403 of the circuit 401, which preferably includes a pair of operational amplifiers 404 and 405, reads the voltage across the resistor 402, as a representative measurement of instantaneous motor current. The level shifting stage 403 converts this voltage to an instantaneous voltage that is proportional, and representative of, the instantaneous current draw of the motor 202M in a voltage range convenient and appropriate to the other components of the circuit 401. An operational amplifier 406, along with its associated equally-sized resistors 407 and 408 and a capacitor 409, provides an amplified signal at approximately one-half of the power supply voltage to the level shifting stage 403, which in turn provides the above-mentioned instantaneous, representative voltage to a preferred solid state relay switch 410.

When the obstruction-caused reversing function is not indicated or needed, the relay switch 410 is set to feed an adjustable, steady by-pass voltage to a pair of operational amplifiers 412 and 413, with this by-pass voltage being supplied from an adjustable preselected potentiometer 411, and being representative of, but slightly higher than, that voltage corresponding to the normal motor current.

A timer delay circuit 414, which includes an operational amplifier 415, a capacitor 416, and a potentiometer 417, is energized by receiving a signal indicating that the door 12 has begun to close, such as a signal from the above-discussed door-closing push buttons 1PB, 2PB, or 4PB. After a delay of approximately 0.75 seconds which allows the door to pass through any detent in its mechanism, the capacitor 416 has become charged to a level higher than the adjustable voltage provided through the potentiometer 417, and the output of the operational amplifier 415 switches (is drawn high). This switching causes the relay switch 410 to be energized and switched to provide the instantaneous signal representative of instantaneous motor current to the above-mentioned operational amplifiers 412 and 413. By way of an R-C circuit 418, another delay of approximately 0.25 seconds is provided in order to allow for signal stabilization, and another preferably solid state relay switch 421 allows the correct reference voltage to be delivered to one input of a comparator amplifier 420, as opposed to a reference voltage essentially at DC power supply which precludes the output of comparator 420 from switching.

The amplifier 412 delivers a voltage representative of the motor current averaged over a preceding, predetermined short time interval, such as 0.5 second, for example, to one input of a difference amplifier 419. Similarly, amplifier 413 delivers the instantaneous voltage, which is representative of the instantaneous motor current (averaged over the preceding 15 milliseconds for noise reduction) to the other input of the difference amplifier 419.

The difference amplifier 419 then delivers a difference voltage to the other input of the comparator amplifier 420, with such difference voltage being representative of the motor current difference between the present instantaneous motor current (from amplifier 413) and the motor current averaged over the preceding 0.5 second (from amplifier 412). If this difference voltage rises to a level above the reference voltage from a potentiometer 422, an obstruction is indicated, and the relay-reversing circuit 423 is actuated to send a signal to the control circuit shown in FIG. 23 in order to stop and reverse the drive motor 202M.

FIG. 25 is a plot of motor current versus time during a closing cycle of the door 12, illustrating the effects on current draw caused by the various above-mentioned motions that the door 12 undergoes during closing.

In response to the signal to initiate the door closing cycle, the motor 202M is energized, and the current draw rises in order to allow the door 12 to initially move and to overcome a detent that serves to hold the door open, as illustrated by curve portion 436. Once this initial detent and inertia resistance is overcome, the door 12 is moved through the relatively low resistance portion of its movement, generally parallel to the side of the vehicle, as indicated by curve portions 437, 438, and 439 for respective vehicle orientations of a 15% uphill grade, a level grade, and a 15% downhill grade for example. Finally, during the above-discussed inward door movement and latching operations, the motor current rises to meet these high-resistance needs and then falls at the completion of the door closing, as indicated by the curve portion 440. Thus, as is discussed above, and as is readily shown in FIG. 25, the drive motor 202M undergoes wide variations in current draw during a normal door closing cycle.

When an obstruction is encountered, however, as is indicated for purposes of example by curve portions 443, 444, or 445, for the respective orientations discussed above the motor current correspondingly rises. Thus, as is discussed above in connection with FIG. 24, the reversing apparatus of the present invention senses such obstruction-caused current changes by circuit logic that effectively compares the instantaneous motor current with a time-averaged reference current that "tracks" the normally varying motor current in order to accurately detect the presence of a predetermined obstruction-caused resistance.

It will be appreciated by those skilled in the art, that in lieu of the hard-wired electronic circuitry shown in FIG. 24, and further explained by FIG. 25, alternative electronic-based door closing control systems may be employed. For example, a microprocessor-based control system may be substituted for the hard-wired electronic control system 401 shown in FIG. 24. In such a microprocessor based embodiment, the input signal from the current sense resistor 402 would be provided to an analog-to-digital converter to convert the voltage across the resistor to a digital value proportional to the amplitude of such voltage. The analog-to-digital converter would provide this signal to a microprocessor which would perform all of the level-shifting, time integrating and averaging, and comparison functions performed by operational amplifier circuits 403, 406, 412–414, and 420. The software implementation of the integration of a time-varying signal, the comparison of digital values, and the shifting of a level of a signal are all well known to those skilled in the microprocessor art and need not be described here. The output of the microprocessor in this alternative embodiment would be used to drive a suitable power output stage such as relay-reversing circuit 423 shown in FIG. 24.

Referring to FIGS. 6 and 8, and as indicated earlier herein, a multi-wire cable 136 may be employed if desired to interconnect the electrical components inside the door 12 (e.g., the limit switches 4LS and 5LS, the push buttons 1PB and 2PB, and the solenoid SOL) with the remaining electrical components of the control system described below in connection with FIG. 23 and with the reversing apparatus of FIG. 24. The cable 136 exits from the forward lower portion of the door 12, by way of an aperture 155, and is supported on the underside of the arm 22, adjacent to the roller 23 by a clamp 154. From the end of the arm 22, the cable 136 proceeds rearwardly along the lower forward guide member 24, parallel to the lower cable member 40, and around the idlers 139 and 138, to a spring driven take-up reel 137, on which it winds during opening movement of the door and from which it unwinds during closing movement of the door 12. An end portion 135 of the cable 136 exits from the upper surface of the take-up reel 137 in order to connect the various wires of the cable 136 to their corresponding lines of the electrical control system of FIG. 23. The various control relays of the electrical control system, and the wires associated therewith, are preferably housed in one or more electrical cabinets, such as the control cabinet or housing 237. The reel 137 is so dimensioned that approximately 3 turns of the reel 137 is sufficient to completely wind and unwind the cable 136 during full opening and closing movements of the door 12. Thus the end portion 135 of the cable 136 is initially installed in an untwisted condition with the door 12 midway between its fully open and fully closed positions so that it only twists approximately 1-½ turns in each direction during opening and closing of the door 12.

It should be pointed out that any of the embodiments of the present invention discussed herein can optionally be employed with or without the inventions disclosed and described in the above-mentioned copending patent applications, entitled "VARYING RADIUS HELICAL CABLE SPOOL FOR POWERED VEHICLE DOOR SYSTEM", "CONTROL APPARATUS FOR POWERED VEHICLE DOOR SYSTEMS", and/or "POWERED CLOSING ASSIST MECHANISM FOR VEHICLE DOORS OR LID MEMBERS". Such inventions of such copending applications can optionally be used either alone or together, and either in addition to, or in substitution for, various components, sub-assemblies, or sub-systems described above, as well be readily apparent to one skilled in the art.

The illustrated exemplary applications of the present invention provide improved control systems and circuitry for powered sliding door systems for automotive vehicles, such as vans, for example. The sliding door 12 is moved with low momentum by the powered sliding door operator between its fully open position and its nearly closed position. In addition, the powered sliding door operator system provides for the complete closing of the sliding door in a slow, controlled manner, and the effort required to manually open and close the sliding door is substantially reduced. Moreover, in the event that the powered sliding door operator or system is not functional, due to a vehicle accident or a system failure or the like, the powered door operator and system of the present invention allows near-normal manual operation for opening and closing the sliding door, even though such manual closing operation may require a high momentum, "slamming" movement, as in conventional sliding door closing arrangements.

In addition, the present invention provides a reversing apparatus for detecting the presence of an obstruction encountered by the movable door, or other movable member, and causing at least a stoppage, and preferably a reversal, of its motion in order to substantially prevent damage to the obstruction, the door or other movable member, or the door operating system. Such reversing apparatus detects changes in drive motor current during door closing that indicate the presence of an obstacle or obstruction by comparing signals representative of instantaneous motor current with a reference signal representative of current that is averaged over a predetermined short time interval. This feature makes the reversing apparatus function independently of the normally varying drive motor current, which results from the changes in the types of movement of the door during closing as described above.

The foregoing discussion discloses and describes merely exemplary embodiments of the present invention for purposes of illustration only. One skilled in the art will readily recognize from such discussion, and from the accompanying drawings and claims, that various changes, modifications and variations can be made therein without departing from the spirit and scope of the invention as defined in the following claims.

What is claimed is:

1. In a device having at least one movable member driven by an electric motor along a predetermined path, an apparatus for detecting an obstruction in the travel path traversed by the member, said apparatus comprising:

first means for monitoring an instantaneous electric current provided to the electric motor to produce a first analog signal representative of the instantaneous amplitude of the motor current;

second means for monitoring an average electric current provided to the electric motor over a predetermined time interval to produce a second analog signal representative of the average amplitude of the motor current; and control means for producing a first control signal when the amplitude of said first signal exceeds the amplitude of said second signal by a predetermined amount whereby said first control signal indicates that the movable member has encountered an obstruction in its path.

2. An apparatus according to claim 1 further comprising:

timing means, responsive to an initiation signal associated with a command to initiate movement of the movable member, for generating a first time-controlled signal after a first time delay period of a first predetermined length; and first time delay means responsive to said first time-controlled signal for blocking a path of said first analog signal between said first means for monitoring and said control means during said first time delay period, and for passing said first analog signal after said first time delay period between said first means for monitoring and said control means.

3. An apparatus according to claim 2 wherein:

said first predetermined time delay length corresponds to a length of time required for the movable member to pass a predetermined first area of a known increased resistance to the movement along the travel path prior to reaching a predetermined second area of a relatively uniform resistance.

4. An apparatus according to claim 3 further comprising:

second time delay timing means for generating a second time-controlled signal after a second time delay period of a second predetermined length after said first time delay; and second time delay for blocking said path of said first analog signal between said first means for monitoring and said control means during said second time delay period, and for passing said first analog signal after said second time delay period between said first means for monitoring and said control means.

5. An apparatus according to claim 4, wherein said first predetermined time delay length is less than about 0.8 seconds.

6. An apparatus according to claim 5, wherein said second predetermined time delay length is less than about 0.3 seconds.

7. An apparatus according to claim 2, wherein said first means for monitoring includes:

means for converting the instantaneous electric current provided to the electric motor to a first voltage signal proportional to the electric current; and level shifting means for producing a second voltage signal proportional to but different in amplitude from the first voltage signal.

8. An apparatus according to claim 7, wherein said first means for monitoring further includes:

means for reducing transient conditions in said first analog signal representative of the instantaneous amplitude of the motor current signal by averaging the motor current signal over a brief time period less than 25 milliseconds.

9. An apparatus according to claim 1, wherein said control means for producing a first control signal includes:

first comparator means for receiving said first and second analog signals and for producing a third analog signal corresponding to a difference in values between said first and second analog signals;

means for producing a reference signal corresponding to said predetermined amount; and second comparator means for producing said first control signal when the amplitude of said third analog signal exceeds the amplitude of said reference signal.

10. An apparatus according to claim 1, further comprising:

output means, responsive to said first control signal, for producing a change of state in a relay device when said first control signal is produced.

11. In an automatic powered door closing system driven by an electric motor, an electronic system for sensing a predetermined increased resistance to closing of a door, said electronic system comprising:

first means for monitoring substantially instantaneous electric current provided to said electric motor, said first means including means for generating a first signal value changing in proportion with changes in said instantaneous electric current;

second means for generating a second signal value corresponding to an average of said first signal value over a shifting span of recent time less than about one second long; and output means for producing an output signal indicating that an obstruction has been encountered by the door when the difference between said first signal value and said second signal value exceeds a predetermined limit.

12. An electronic system according to claim 11, wherein said means for monitoring includes:

level shifting means responsive to said substantially instantaneous electric current for producing a level-shifted signal proportional to, but different from, the amplitude of said instantaneous current;

means for producing a predetermined time delay after a close door command; and means for inhibiting the delivery of said first signal value to said output means during said predetermined time delay.

13. An electronic system according to claim 12, wherein said means for producing a predetermined time delay includes a potentiometer for adjusting the length of said predetermined time delay within a predetermined range of values.

14. An electronic system according to claim 11, further comprising:

means for producing a reference signal proportional to the power supply voltage level, and for providing said reference signal to said first means for monitoring, said first means for monitoring including means for adjusting said first signal value produced thereby in order to compensate for fluctuations in the power supply level.

15. A door operator system for a door that is slidingly supported relative to a door opening in a panel of a vehicle body, said door being supported adjacent a forward end on at least one forward guide member and being supported adjacent a rear end on a rear guide member, said guide members guiding said door through an initial closing movement and a final opening movement generally parallel to said panel, said guide members guiding said door through at least a portion of its initial opening movement generally away from the plane of said door opening, and said guide members guiding said door through at least a portion of its final closing movement generally toward the plane of said door opening, said door operator comprising a first cable having one end coupled to the rear end of said door and a second cable having one end coupled to the forward end of said door for driving said door along said guide members to thereby move said door through said initial and final opening and closing movements, each of said cables being supported substantially entirely within the interior of the vehicle body when the door is fully closed, said door operator system further including a rotatable cable spool and drive means including an electric motor for selectively rotating said cable spool about an axis in either of two directions in order to actuate said first and second cables, said door operator system further including an electronic reversing apparatus for sensing a predetermined increased resistance to closing of said door indicating the presence of an obstruction encountered by said closing door, said electronic reversing apparatus including: first means for monitoring substantially instantaneous electric current provided to said electric motor, said first means including means for generating a first signal value changing in proportion with changes in said instantaneous electric current prior to said door encountering said obstruction; second means for generating a second signal value corresponding to an average of said first signal value over a shifting span of recent time less than about one second long; and output means for producing an output signal indicating that said obstruction has been encountered by said door when the difference between said first signal value and said second signal value exceeds a predetermined limit.

16. The invention according to claim 15, wherein said first means for monitoring includes: level shifting means responsive to said substantially instantaneous electric current for producing a level-shifted signal proportional to, but different from, the amplitude of said instantaneous current; means for producing a predetermined time delay after a close door command; and means for inhibiting the delivery of said first signal value to said output means during said predetermined time delay.

17. The invention according to claim 16, wherein said means for producing a predetermined time delay includes a potentiometer for adjusting the length of said predetermined time delay within a predetermined range of values.

18. The invention according to claim 15, further comprising: means for producing a reference signal proportional to the power supply voltage level, and for providing said reference signal to said first means for monitoring, said first means for monitoring including means for adjusting said first signal value produced thereby in order to compensate for fluctuations in the power supply level.

* * * * *